(12) United States Patent
Copeland

(10) Patent No.: US 11,797,586 B2
(45) Date of Patent: Oct. 24, 2023

(54) PRODUCT PRESENTATION FOR CUSTOMER RELATIONSHIP MANAGEMENT

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 165 days.

(21) Appl. No.: 17/248,314

(22) Filed: Jan. 19, 2021

(65) Prior Publication Data
US 2022/0229861 A1 Jul. 21, 2022

(51) Int. Cl.
| | |
|---|---|
| *G06F 16/33* | (2019.01) |
| *H04M 3/51* | (2006.01) |
| *G10L 15/18* | (2013.01) |
| *G10L 15/22* | (2006.01) |
| *G06Q 30/016* | (2023.01) |

(Continued)

(52) U.S. Cl.
CPC .......... *G06F 16/3344* (2019.01); *G06F 3/167* (2013.01); *G06F 40/205* (2020.01); *G06F 40/30* (2020.01); *G06Q 30/016* (2013.01); *G10L 15/1815* (2013.01); *G10L 15/1822* (2013.01); *G10L 15/22* (2013.01); *H04M 3/5183* (2013.01)

(58) Field of Classification Search
CPC .... G06F 16/3344; G06F 3/167; G06F 40/205; G06F 40/30; G06Q 30/016; G10L 15/1815; G10L 15/1822; G10L 15/22; H04M 3/5183
See application file for complete search history.

(56) References Cited

U.S. PATENT DOCUMENTS 5,175,814 A * 12/1992 Anick ................. G06F 16/2428
715/835
6,785,380 B2   8/2004 Ribera
(Continued)

FOREIGN PATENT DOCUMENTS

| KR | 1020180058877 | 7/2018 |
|---|---|---|
| WO | 20160139666 A1 | 9/2016 |

OTHER PUBLICATIONS

AU Office Action in Australian Appln. No. 2022200232, dated Jul. 18, 2022, 6 pages.
(Continued)

*Primary Examiner* — Lisa Hashem
(74) *Attorney, Agent, or Firm* — Fish & Richardson P.C.

(57) ABSTRACT

A speech enabled product presentation engine for customer relationship management ('CRM') comprising: a product recognition module; the product recognition module comprising a module of automated computing machinery stored on one or a non-transitory computer-readable mediums and configured to: identify, in dependence upon digitized speech for recognition, a product articulated in the conversation between a tele-agent and a customer. The presentation engine also includes a product dimension module. comprising a module of automated computing machinery stored on one or a non-transitory computer-readable mediums and configured to: query an internal CRM, in dependence upon the identified product, and receive one or more descriptions of one or more dimensions of the product for presentation to the tele-agent during a call with the customer.

17 Claims, 13 Drawing Sheets

(51) Int. Cl.
    *G06F 3/16*     (2006.01)
    *G06F 40/30*     (2020.01)
    *G06F 40/205*     (2020.01)

(56) References Cited

U.S. PATENT DOCUMENTS

| | | | |
|---|---|---|---|
| 6,804,330 B1* | 10/2004 | Jones | H04M 3/4938 |
| | | | 455/563 |
| 6,829,603 B1 | 12/2004 | Chai et al. | |
| 7,275,083 B1 | 9/2007 | Seibel et al. | |
| 7,486,785 B2 | 2/2009 | Flores | |
| 8,108,237 B2 | 1/2012 | Bourne et al. | |
| 8,332,279 B2 | 12/2012 | Woolston | |
| 8,411,843 B1 | 4/2013 | Cyriac | |
| 9,049,295 B1 | 6/2015 | Cooper | |
| 9,165,556 B1 | 10/2015 | Sugar | |
| 9,848,082 B1 | 12/2017 | Lilland | |
| 9,860,391 B1 | 1/2018 | Wu et al. | |
| 9,936,066 B1 | 4/2018 | Mammen et al. | |
| 9,942,779 B1 | 4/2018 | Proctor | |
| 9,948,783 B1 | 4/2018 | Farrell | |
| 10,026,092 B2 | 7/2018 | Heater et al. | |
| 10,057,423 B1 | 8/2018 | Sheikh | |
| 10,101,976 B2 | 10/2018 | Cavalcante | |
| 10,303,466 B1 | 5/2019 | Karman | |
| 10,482,384 B1 | 11/2019 | Stoilos | |
| 10,623,572 B1* | 4/2020 | Copeland | H04M 3/5191 |
| 11,468,882 B2* | 10/2022 | Copeland | G10L 15/22 |
| 11,501,780 B2* | 11/2022 | Adlersberg | G06F 40/35 |
| 2003/0126136 A1 | 7/2003 | Omoigui | |
| 2004/0139107 A1* | 7/2004 | Bachman | G06F 16/951 |
| 2004/0143473 A1 | 7/2004 | Tivey et al. | |
| 2004/0210881 A1 | 10/2004 | Friedman | |
| 2005/0005266 A1 | 1/2005 | Datig | |
| 2005/0021502 A1* | 1/2005 | Chen | G06F 16/2471 |
| 2005/0044357 A1 | 2/2005 | Fano | |
| 2005/0065909 A1* | 3/2005 | Musgrove | G06Q 30/0256 |
| 2005/0105712 A1 | 5/2005 | Williams et al. | |
| 2006/0095273 A1 | 5/2006 | Montvay et al. | |
| 2006/0098625 A1 | 5/2006 | King | |
| 2006/0239439 A1 | 10/2006 | Blackwood | |
| 2007/0019618 A1 | 1/2007 | Shaffer | |
| 2007/0064913 A1 | 3/2007 | Shaffer | |
| 2007/0094183 A1 | 4/2007 | Paek et al. | |
| 2007/0198249 A1* | 8/2007 | Adachi | G06F 40/205 |
| | | | 704/9 |
| 2007/0233561 A1 | 10/2007 | Golec | |
| 2008/0162498 A1 | 7/2008 | Omoigui | |
| 2008/0275744 A1 | 11/2008 | MacIntyre et al. | |
| 2009/0018952 A1* | 1/2009 | Beltran | G06Q 30/02 |
| | | | 705/38 |
| 2009/0070322 A1 | 3/2009 | Salvetti | |
| 2009/0132474 A1 | 5/2009 | Ma | |
| 2009/0245500 A1 | 10/2009 | Wampler | |
| 2009/0271192 A1 | 10/2009 | Marquette | |
| 2010/0010802 A1 | 1/2010 | Ruano | |
| 2010/0036788 A1 | 2/2010 | Wu | |
| 2010/0063799 A1 | 3/2010 | Jamieson | |
| 2010/0114563 A1 | 5/2010 | Choi | |
| 2011/0077999 A1 | 3/2011 | Becker et al. | |
| 2011/0082829 A1 | 4/2011 | Kolovski | |
| 2011/0113094 A1 | 5/2011 | Chunilal | |
| 2011/0206198 A1 | 8/2011 | Freedman | |
| 2011/0264451 A1 | 10/2011 | Hoepfinger | |
| 2012/0059776 A1 | 3/2012 | Estes | |
| 2012/0078636 A1 | 3/2012 | Ferrucci | |
| 2012/0233558 A1 | 9/2012 | Naim | |
| 2012/0275642 A1 | 11/2012 | Aller | |
| 2012/0278091 A1 | 11/2012 | Yaseen et al. | |
| 2012/0303355 A1 | 11/2012 | Liu et al. | |
| 2013/0091090 A1 | 4/2013 | Spivack et al. | |
| 2013/0006916 A1 | 6/2013 | McBride | |
| 2013/0163731 A1 | 6/2013 | Yan | |
| 2013/0204663 A1 | 8/2013 | Kahlow | |
| 2014/0022328 A1 | 1/2014 | Gechter et al. | |
| 2014/0081585 A1 | 3/2014 | Cappucino et al. | |
| 2014/0081934 A1 | 3/2014 | Mizell | |
| 2014/0122535 A1 | 5/2014 | Gerard | |
| 2014/0156681 A1 | 6/2014 | Lee et al. | |
| 2014/0164502 A1 | 6/2014 | Khodorenko | |
| 2014/0189680 A1 | 7/2014 | Kripalani | |
| 2014/0201234 A1 | 7/2014 | Lee et al. | |
| 2014/0270108 A1 | 9/2014 | Riahi et al. | |
| 2014/0278343 A1 | 9/2014 | Tran | |
| 2014/0314225 A1 | 10/2014 | Riahi | |
| 2014/0343927 A1 | 11/2014 | Sandei et al. | |
| 2014/0372630 A1 | 12/2014 | Bostick | |
| 2014/0379755 A1 | 12/2014 | Kuriakose | |
| 2015/0012350 A1 | 1/2015 | Li et al. | |
| 2015/0066479 A1 | 3/2015 | Pasupalak | |
| 2015/0189085 A1 | 7/2015 | Riahi et al. | |
| 2015/0201077 A1 | 7/2015 | Konig et al. | |
| 2015/0242410 A1 | 8/2015 | Pattabhiraman et al. | |
| 2015/0254234 A1 | 9/2015 | Dixit et al. | |
| 2015/0261743 A1 | 9/2015 | Sengupta | |
| 2015/0294405 A1 | 10/2015 | Hanson | |
| 2015/0309994 A1 | 10/2015 | Liu | |
| 2015/0348551 A1 | 12/2015 | Gruber | |
| 2015/0379603 A1 | 12/2015 | Gupta | |
| 2016/0019882 A1 | 1/2016 | Matula | |
| 2016/0021181 A1 | 1/2016 | Ianakiev et al. | |
| 2016/0034457 A1 | 2/2016 | Bradley | |
| 2016/0036981 A1 | 2/2016 | Hollenberg | |
| 2016/0036982 A1 | 2/2016 | Ristock | |
| 2016/0036983 A1 | 2/2016 | Korolev | |
| 2016/0048854 A1 | 2/2016 | Kahlow | |
| 2016/0117593 A1 | 4/2016 | London | |
| 2016/0162913 A1 | 6/2016 | Linden et al. | |
| 2016/0171099 A1 | 6/2016 | Lorge et al. | |
| 2016/0188686 A1 | 6/2016 | Hopkins | |
| 2016/0189028 A1 | 6/2016 | Hu et al. | |
| 2016/0217479 A1 | 7/2016 | Kashyap et al. | |
| 2016/0239851 A1 | 8/2016 | Tanner | |
| 2016/0162474 A1 | 9/2016 | Agarwal | |
| 2016/0321748 A1 | 11/2016 | Mahatm | |
| 2016/0335544 A1 | 11/2016 | Bretschneider et al. | |
| 2016/0371724 A1 | 12/2016 | Kulpa et al. | |
| 2017/0017694 A1 | 1/2017 | Roytman et al. | |
| 2017/0024375 A1 | 1/2017 | Hakkani-Tur | |
| 2017/0091390 A1 | 3/2017 | Joul | |
| 2017/0124193 A1 | 5/2017 | Li | |
| 2017/0147635 A1 | 5/2017 | McAteer et al. | |
| 2017/0154108 A1 | 6/2017 | Li et al. | |
| 2017/0177715 A1 | 6/2017 | Chang | |
| 2017/0200220 A1 | 7/2017 | Nicholson | |
| 2017/0195488 A1 | 8/2017 | Pendyaia | |
| 2017/0262429 A1 | 9/2017 | Harper | |
| 2017/0262530 A1 | 9/2017 | Okura | |
| 2017/0293610 A1 | 10/2017 | Tran | |
| 2017/0357636 A1 | 12/2017 | Shafiulla et al. | |
| 2018/0082183 A1 | 3/2018 | Hertz et al. | |
| 2018/0115644 A1 | 4/2018 | Al-Khaja | |
| 2018/0144250 A1 | 5/2018 | Kwon | |
| 2018/0150459 A1 | 5/2018 | Farid | |
| 2018/0288098 A1 | 10/2018 | Wang | |
| 2018/0300310 A1 | 10/2018 | Shinn | |
| 2018/0315000 A1 | 11/2018 | Kulkarni | |
| 2018/0315001 A1 | 11/2018 | Garner | |
| 2018/0338040 A1 | 11/2018 | Carly | |
| 2018/0365772 A1 | 12/2018 | Thompson | |
| 2018/0376002 A1 | 12/2018 | Abraham | |
| 2019/0042988 A1 | 2/2019 | Brown | |
| 2019/0080370 A1 | 3/2019 | Copeland | |
| 2019/0188617 A1 | 6/2019 | Copeland | |
| 2019/0206400 A1 | 7/2019 | Cui | |
| 2019/0220794 A1 | 7/2019 | Kulkarni | |
| 2019/0294642 A1 | 9/2019 | Matlick | |
| 2019/0340294 A1 | 11/2019 | Spangler | |
| 2020/0042642 A1 | 2/2020 | Bakis | |
| 2020/0097814 A1 | 3/2020 | Devesa | |
| 2020/0110835 A1 | 4/2020 | Zhao | |
| 2020/0111485 A1* | 4/2020 | Copeland | H04M 3/51 |
| 2020/0118555 A1 | 4/2020 | Copeland | |

(56) References Cited

U.S. PATENT DOCUMENTS

2021/0004536 A1* 1/2021 Adibi .................. G10L 15/1822
2022/0229861 A1* 7/2022 Copeland ............. G06Q 30/016
2022/0398598 A1* 12/2022 Das ....................... G06F 40/284

OTHER PUBLICATIONS

Jan. 10, 2020 Office Action for corresponding U.S. Appl. No. 15/700,210.
Jan. 25, 2020 Office Action for corresponding U.S. Appl. No. 15/844,512.
Jul. 25, 2019 Office Action for corresponding U.S. Appl. No. 16/198,742.
Final Office Action dated Jul. 27, 2020 for corresponding U.S. Appl. No. 15/844,512.
Final Office Action dated Jul. 30, 2020 for corresponding U.S. Appl. No. 16/154,718.
Final Office Action dated Jul. 7, 2020 for corresponding U.S. Appl. No. 15/700,210.
Mar. 5, 2020 Office Action for corresponding U.S. Appl. No. 16/183,736.
May 4, 2020 Office Action for corresponding U.S. Appl. No. 16/154,718.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.
Oct. 19, 2020 Notice of Allowance for corresponding U.S. Appl. No. 16/157,075.
Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.
International Search Report and Written Opinion dated Jan. 9, 2020 for PCT/US2019/055488.
International Search Report and Written Opinion dated Jan. 14, 2020 for PCT/US2019/060174.
International Search Report and Written Opinion dated Jan. 17, 2020 for PCT/US2019/058997.
International Search Report and Written Opinion dated Feb. 22, 2019 for PCT/US2018/065584.
International Search Report and Written Opinion dated Mar. 9, 2020 for PCT/US2019/059949.
International Search Report and Written Opinion dated Apr. 1, 2020 for PCT/US2019/055483.
International Search Report and Written Opinion dated Nov. 28, 2018 for PCT/US2018/049813.
International Search Report and Written Opinion dated Dec. 30, 2019 for PCT/US2019/062629.
Dec. 8, 2020 Notice of Allowance for corresponding U.S. Appl. No. 16/947,802.
Jan. 14, 2021 Office Action for corresponding U.S. Appl. No. 16/154,718.
Jan. 27, 2021 Office Action for corresponding U.S. Appl. No. 15/700,210.
Feb. 25, 2021 Office Action for corresponding U.S. Appl. No. 15/844,512.
Mar. 16, 2021 Office Action for corresponding U.S. Appl. No. 16/183,725.

* cited by examiner

PRODUCT PRESENTATION FOR CUSTOMER RELATIONSHIP MANAGEMENT

ADDITIONAL APPLICATIONS

The following U.S. patent applications, having subject matter somewhat relevant to this application, are hereby for all purposes incorporated by reference into this application as though fully set forth herein:

U.S. patent application Ser. No. 15/700,210; filed Sep. 11, 2017, entitled Dynamic Scripts for Tele-Agents;

U.S. patent application Ser. No. 15/844,512; filed Dec. 15, 2017, entitled Dynamic Lead Generation;

U.S. patent application Ser. No. 16/157,075; filed Oct. 10, 2018, entitled Semantic Jargon;

U.S. patent application Ser. No. 16/154,718 filed Oct. 9, 2018, entitled Semantic Call Notes U.S. patent application Ser. No. 16/177,423 filed Oct. 31, 2018, entitled Semantic Inferencing in Customer Relationship Management U.S. patent application Ser. No. 16/183,725, filed Nov. 7, 2018, entitled Semantic CRM Mobile Communications Sessions U.S. patent application Ser. No. 16/183,736, filed Nov. 8, 2018, entitled Semantic Artificial Intelligence Agent; and U.S. patent application Ser. No. 16/198,742 filed Nov. 21, 2018, entitled Semantic CRM Transcripts from Mobile Communications Sessions

BACKGROUND

The development of the EDVAC computer system of 1948 is often cited as the beginning of the computer era. Since that time, computer systems have evolved into complicated devices. These complicated devices include complicated computer memory. Methods and systems for efficient use of computer memory continue to evolve.

Customer Relationship Management ('CRM') is an approach to managing a company's interaction with current and potential customers. CRM often implements data analysis of customers' history with a company to improve business relationships with customers, specifically focusing on customer retention and sales growth. CRM systems often compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales.

In view of their sheer size, CRM systems today tend to lack the infrastructure to make full use of the information they can access. A single tele-agent, working in a contact center supporting a hundred agents, is tasked to operate across several, or even many, client CRM systems, each having different interfaces. The need to learn many interfaces increases risk of error. The need to learn many interfaces is an inefficient use of agent time. The need to operate across many interfaces slows the agent's workflow, an additional inefficiency. Furthermore, often systems for CRM do not provide the information to the tele-agent that is known or should be known to the enterprise.

Figure 11:
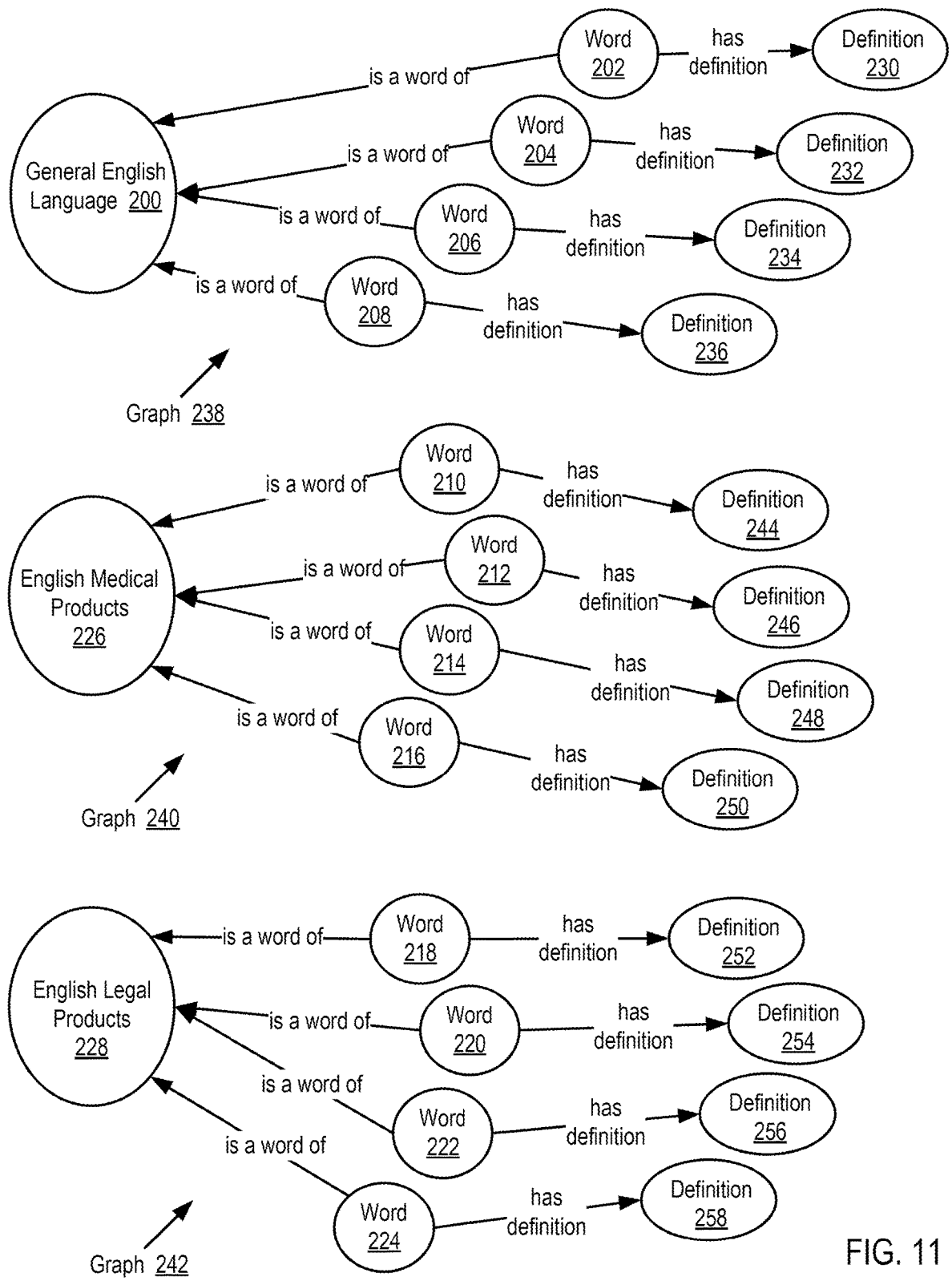

For further explanation, FIG. 11 sets forth separate graphs of a general language triple store, a medical product in English, and a legal product in English.

Figure 12:
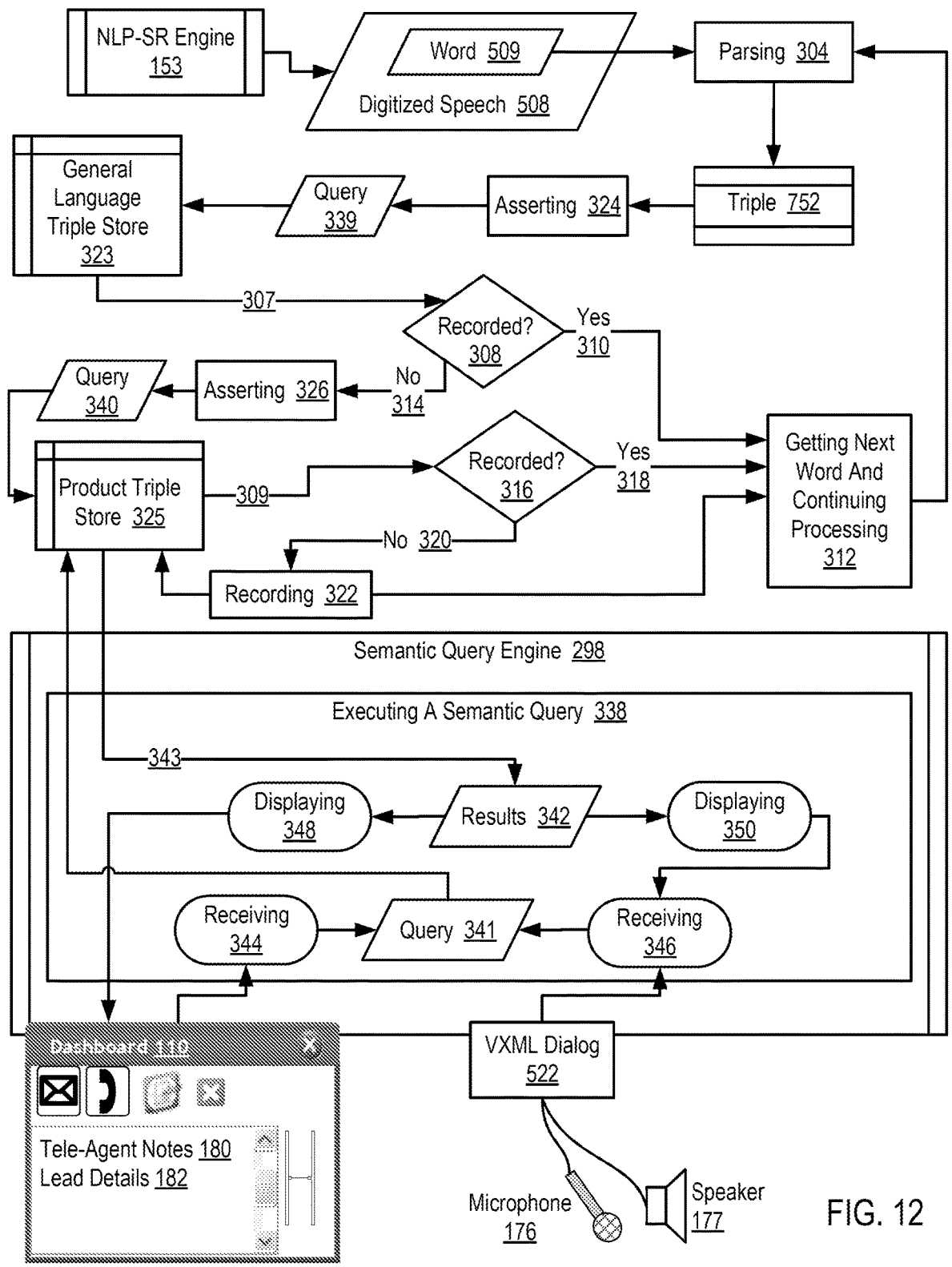

FIG. 12 sets forth a flow chart illustrating a further example method of product presentation according to embodiments of the present invention.

Figure 13:
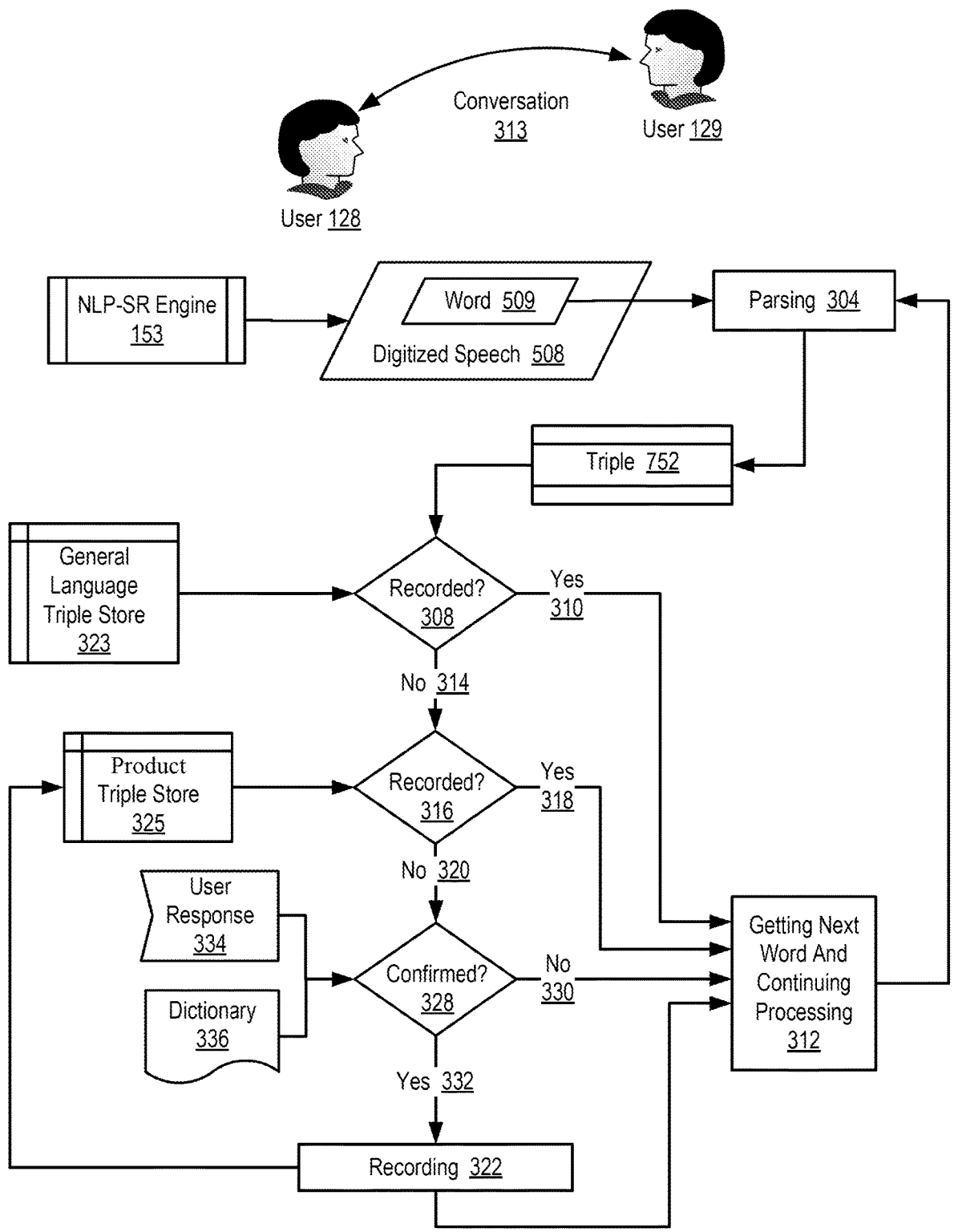

FIG. 13 sets forth a flow chart illustrating a further example method of product presentation to embodiments of the present invention.

DETAILED DESCRIPTION OF EXAMPLE EMBODIMENTS

Figure 1:
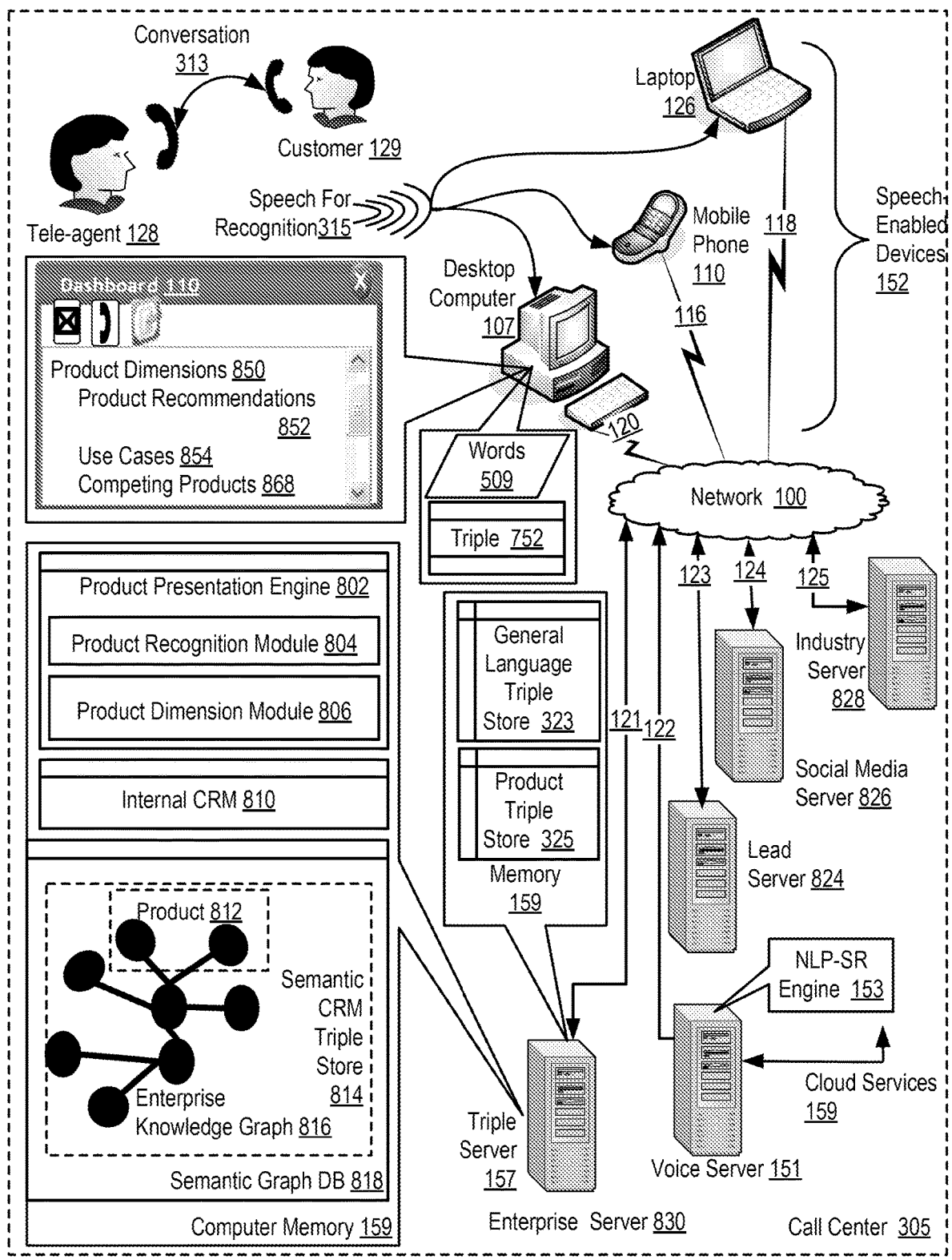
FIG. 1 sets forth a network diagram illustrating an example system for product presentation for CRM according to embodiments of the present invention.

Example methods, apparatus, and products for product presentation for customer relationship management are described with reference to the accompanying drawings, beginning with FIG. 1. FIG. 1 sets forth a network diagram illustrating an example system for product presentation according to embodiments of the present invention.

In this disclosure the terms product and products are used in a broad fashion. The terms product or products are meant to include both goods and services, specific articles such as software installation identified as narrowly as a product with a serial number or some product ID well known to those of skill in the art. Furthermore, the terms product or products may be used to describe a suite or class of goods or services such as, for example, software product suites. The terms products and products may be used with reference to goods or services for specific industries, or for specific uses, and so on as will occur to those of skill in the art.

Product presentation for customer relationship management ('CRM') in the example of FIG. 1 is implemented with at least one speech-enabled device (152), a triple server (157), and a voice server (151). A speech-enabled device is automated computing machinery configured to accept and recognize speech from a user and express to a user voice prompts and speech responses. Speech-enabled devices in the example of FIG. 1 include a desktop computer (107), a smartwatch (112), a mobile phone (110), a laptop computer (126), and a product presentation engine (802) a module of automated computing machinery stored, in the example of FIG. 1, on an enterprise server (830). Each speech-enabled device in this example is coupled for data communications through network (100) to the triple server (157) and the voice server (151). The desktop computer is connected through wireline connection (120), while the smartwatch (112), mobile phone (110), and laptop (126) are connected respectively through wireless connections (114, 116, 118), the product presentation engine (802) is connected through a wireline connection (121) to the enterprise server (830).

The overall example system illustrated in FIG. 1 operates generally for product presentation for CRM according to embodiments of the present invention by parsing a word (509) of digitized speech (508) from a conversation (313) into a triple (752) of a description logic. The overall example system of FIG. 1 also operates generally to determine whether the parsed triple (752) is recorded in a general language triple store (323), determine whether the parsed triple is recorded in a product triple store (325), and, if the parsed triple is recorded in neither the general language triple store nor the product triple store, record the parsed triple in the product triple store.

The general language triple store (323) is composed of structured definitions of words not special to any particular knowledge domain, where each structured definition of the general language store is implemented with a triple of description logic. In a similar fashion, the product triple store (325) is composed of structured definitions of words that are special to a particular knowledge domain of products, where each structured definition of the product triple store is implemented with a triple of description logic.

The word (509) of digitized speech (508) is speech for recognition (315) from a conversation (313) between the tele-agent (128) and the customer (129). The speech for recognition can be the entire conversation, where, for example, both persons speaking are in the same room, and the entire conversation is picked up by a microphone on a speech-enabled device. The scope of speech for recognition can be reduced by providing to a speech-enabled device only on one side of the conversation, as only through a microphone on a headset. The scope of speech for recognition can be reduced even further by providing for recognition only speech that responds to a prompt from, for example, a VoiceXML dialogue executing on a speech-enabled device. As the scope of speech for recognition is reduced, data processing burdens are reduced across the system as a whole, although it remains an option, in some embodiments at least, to recognize the entire conversation and stream across flow of all words in the conversation.

Speech from the conversation (313) is recognized into digitized speech by operation of a natural language processing speech recognition ("NLP-SR") engine (153), shown here disposed upon a voice server (151), but also amenable to installation on speech-enabled devices. The NLP-SR engine also carries out the parsing of a word (509) of the speech so digitized (508) into a triple (752) of a description logic.

A triple is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role.

In this example description, the elements of a triple are referred to as subject, predicate, and object—and expressed like this: <subject> <predicate> <object>. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets, is one form of abstract syntax, optimized for human readability rather than machine processing, although its substantive content is correct for expression of triples. Using this abstract syntax, here are examples of triples:

<Bob> <is a> <person>
    <Bob> <is a friend of> <Alice>
    <Bob> <is born on> <the $4^{th}$ of July 1990>
    <Bob> <is interested in> <the Mona Lisa>
    <the Mona Lisa> <was created by> <Leonardo da Vinci>
    <the video 'La Joconde á Washington'> <is about> <the Mona Lisa>

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

The example of FIG. 1 includes a semantic graph database (818) which includes an enterprise knowledge graph (816). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

In the example of FIG. 1, the semantic graph database (816) includes a semantic CRM triple store (814). The semantic CRM triple store (804) of FIG. 1 includes triple stores for access by the internal CRM (810). The triple stores may include a general language triple store (323) of words that are not associated with any particular knowledge domain. The semantic CRM triple store (804) also includes a product triple store (325) including words for recognition in the knowledge domain of products. Such products may also have many triple stores identifying the details of the product such as the availability of the product, the source of the product, the compatibility of the product within various computing environments and so on as will occur to those of skill in the art. In the example, of FIG. 1 often the information regarding products in the semantic CRM triple store may be useful in product presentation according to embodiments of the present invention.

As mentioned above, the example of FIG. 1 includes an internal CRM (810). Such an internal CRM is a CRM system configured for the use of tele-agents and other users of the enterprise having access to the internal CRM. Often data stored on and accessed by the internal CRM is data owned by the enterprise itself and collected over time for the use of various users of the organization as will occur to those of skill in the art.

The example of FIG. 1 includes a product presentation engine (802). The product presentation engine of FIG. 1 is a module of automated computing machinery stored on one or more non-transitory computer-readable mediums. The product presentation engine (802) of FIG. 1 includes a product recognition module (804) and a product dimension module. The product recognition module (804) comprises a module of automated computing machinery stored on one or more non-transitory computer-readable mediums (159) and configured to: identify, in dependence upon digitized speech for recognition (315), a product (812) articulated in the conversation between a tele-agent and a customer. Such a product may be identified by product ID, product name, manufacturer, description of the products characteristics, the industry supported by the product and so on as will occur to those of skill in the art.

The product dimension module (808) also comprises a module of automated computing machinery stored on one or a non-transitory computer-readable mediums (159) and configured to query an internal CRM (810), in dependence upon the identified product (812), and receive one or more descriptions of one or more dimensions of the product for presentation to the tele-agent during a call with the customer. The dimensions of the product include data and metadata regarding the product. Such data may be proprietary or accessed through third parties such as those operating the lead server (824) serving leads to the enterprise, a social media server (826) providing information with regard to the customer and the product and other useful information, an industry server (828) providing information of various industries and the products used in those industries as well as collateral material for use by a tele-agent discussing the product with a customer and other useful information as will occur to those of skill in the art.

The use of a lead server (824), social media server (826) and the industry server (828) in the example of FIG. 1 is for ease of explanation and not for limitation. In fact, product presentation according to embodiments of the present invention may make use of many other third-party systems as will occur to those of skill in the art.

The example of FIG. 1 includes a dashboard (110) for the tele-agent's use during a conversation between the tele-agent (128) and the customer (129). The dashboard (110) is a speech-enabled user interface upon and through which the product presentation engine (802) provides real-time product dimensions (850) for display to the tele-agent (128) through the dashboard (110) for the tele-agent's use during a conversation between the tele-agent (128) and the customer (129). As mentioned above, descriptions of such product dimensions may be many and come from both internal proprietary data stores of the enterprise, as well as product information retrieved by the product presentation engine from third-party providers.

Computer memory (159) includes cache, random access memory ("RAM"), disk storage, and so on, most forms of computer memory. Computer memory (159) so configured typically resides upon speech-enabled devices, or, as shown here, upon one or more triple servers (157).

Figure 2:
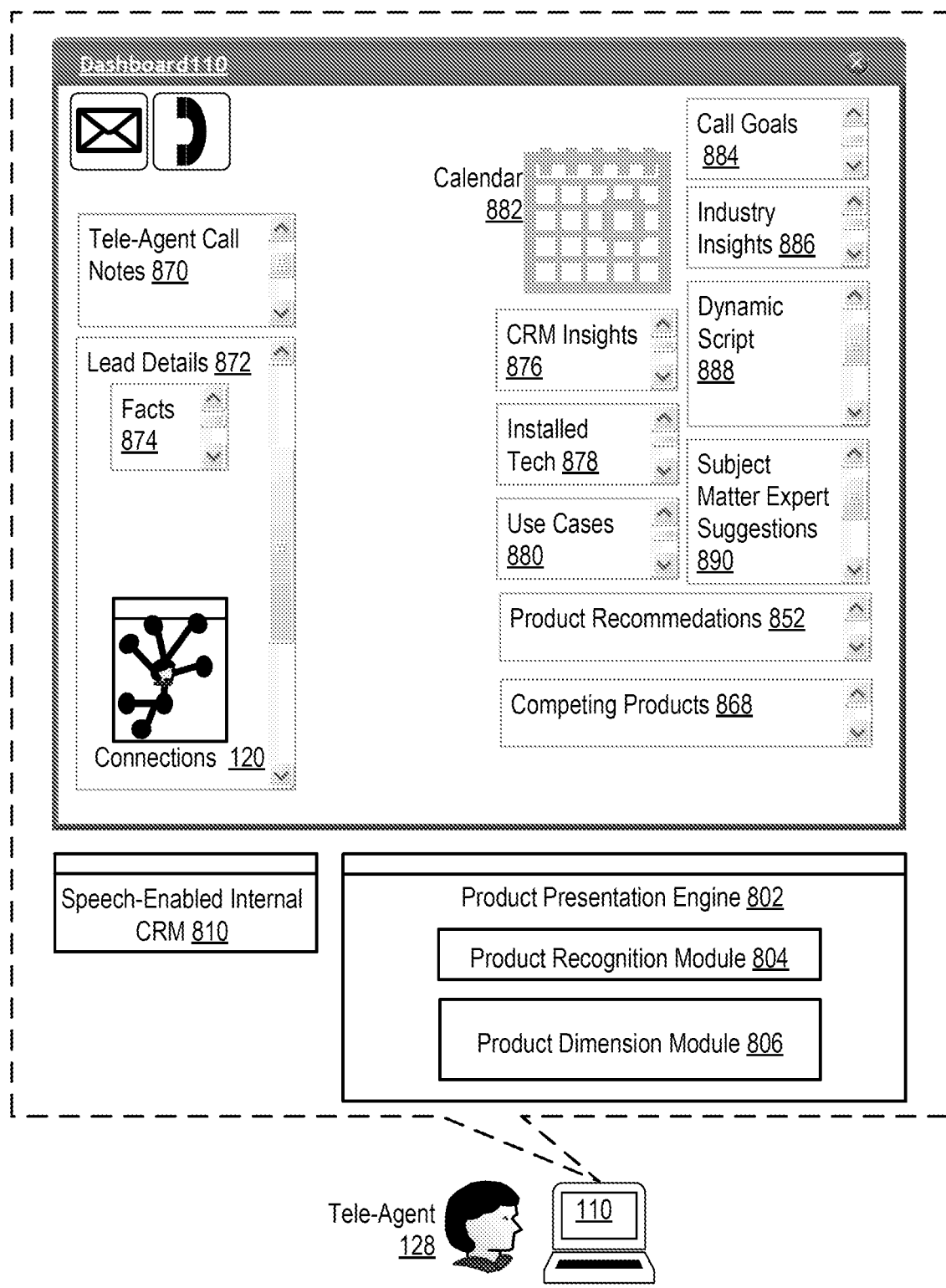
FIG. 2 sets forth a line drawing of an example system for product presentation according to embodiments of the present invention.

For further explanation, FIG. 2 sets forth a line drawing of an example system for product presentation according to embodiments of the present invention. Example of FIG. 2 includes a speech-enabled internal CRM (810) having data store of proprietary and non-proprietary information regarding, among other things, products that may be discussed between a tele-agent (128) and customers. Such information may be provided to the product presentation engine who in turn provides product dimension information onto the dashboard making the information available of use by the tele-agent (128) in real-time during a conversation between the tele-agent and the customer.

The example of FIG. 2 includes a product presentation engine (802) that includes a product recognition module (804) and a product dimension engine (806). The product recognition module (804) comprises a module of automated computing machinery stored on one or more non-transitory computer-readable mediums (159) and configured to: identify, in dependence upon digitized speech for recognition, a product articulated in the conversation between a tele-agent and a customer. Such a product may be identified by product ID, product name, manufacturer, description of the products characteristics, the industry supported by the product and so on as will occur to those of skill in the art.

The product dimension module (808) also comprises a module of automated computing machinery stored on one or a non-transitory computer-readable mediums (159) and configured to query an internal CRM (810), in dependence upon the identified product (812), and receive one or more descriptions of one or more dimensions of the product for presentation to the tele-agent during a call with the customer. The dimensions of the product include data and metadata regarding the product. Such data may be proprietary or accessed through third parties such as those operating the lead server (824) serving leads to the enterprise, a social media server (826) providing information with regard to the customer and the product and other useful information, an industry server (828) providing information of various industries and the products used in those industries as well as collateral material for use by a tele-agent discussing the product with a customer and other useful information as will occur to those of skill in the art.

In the example of FIG. 2, the tele-agent is provided real-time product information displayed on the dashboard (110) for real-time use by the tele-agent during a conversation with the customer. In the example of FIG. 2, the speech-enabled dashboard includes a widget for the display of the tele-agent's call notes (870). Such call notes may be prepared or supplemented by the tele-agent before, during, or after a conversation with the customer.

In the example of FIG. 2, the speech-enabled dashboard (110) includes a widget for the display of the lead details (872) including information describing the customer and customer's business often including name and contact information of the customer, the industry supported by the customer, the locations the customer conducts business, and other useful information that may be included in a listing of facts (874) about the customer. The dashboard (110) of FIG. 2 also displays a connections list (120) that provides to the tele-agent (128) any known connections between the customer and other customers or people or organizations traced within the internal CRM (810).

In the example of FIG. 2, the speech-enabled dashboard (110) includes a widget for the display of a calendar (802) and CRM insights (876) displaying insights regarding the customer known or derived by the internal CRM (810). In the example of FIG. 2, the speech-enabled dashboard (110) includes a widget for the display of the technology (878) currently installed in the customer's sites and useful in discussing products that are compatible with that installed technology with the customer.

In the example of FIG. 2, the speech-enabled dashboard (110) includes a widget for the display of use cases (880) describing the product that may be useful to the tele-agent during a conversation with the customer. In the example of FIG. 2, the speech-enabled dashboard (110) includes a widget for the display of product recommendations (852) for the customer and a display of competing products (868) that may be sold by competitors of the tele-agent that are compatible with the currently installed technology already in use by the customer.

In the example of FIG. 2, the speech-enabled dashboard (110) includes a widget for the display of the call goals (884) set by the tele-agent or set for the tele-agent and a widget for the display of industry insights (886) identified for the tele-agents use. Industry insights may include current trends in the customer's industry, newly available products for use in an industry, current news regarding the industry and so on as will occur to those of skill in the art. In the example of FIG. 2, the speech-enabled dashboard (110) includes a widget for the display of the a dynamic script (888) often created in real-time as a guidance and aid for the tele-agent in the conversation with the customer. The speech-enabled dashboard (110) includes a widget for the display of subject matter experts' suggestions (890) regarding the industry, or products, or other information that may be useful to the tele-agent during the call with the customer.

The components and widgets presented in the example of FIG. 2 are for explanation and not for limitation. Components and widgets, as well as the functions they perform and information they provide may vary dramatically among various embodiments of the present invention as will occur to those of skill in the art. All such components and widgets whatever their form may be used for product presentation according to various embodiments of the present invention.

Figure 3:
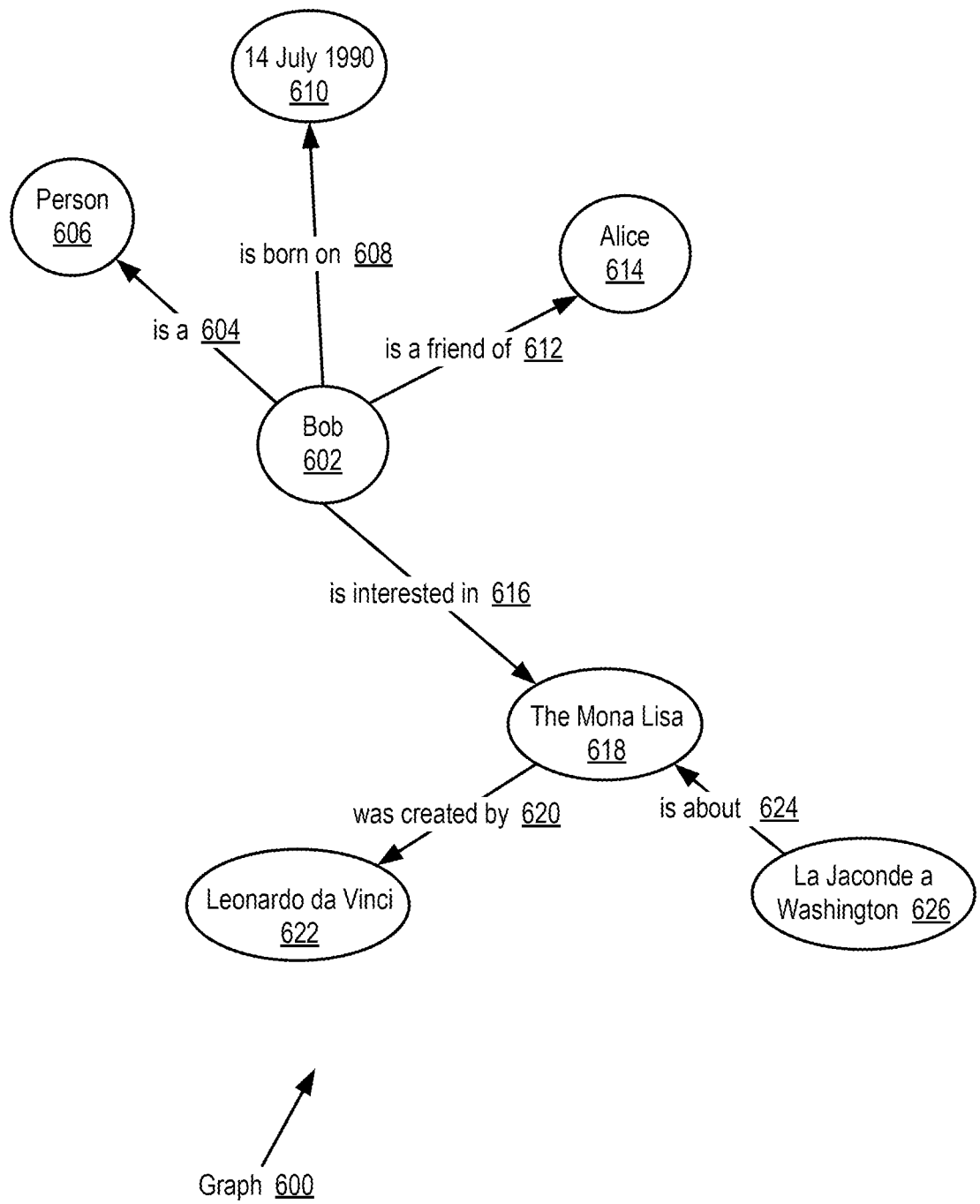
FIG. 3 sets forth a line drawing of a graph.

For further explanation of relations among triples and graphs, FIG. 3 sets forth a line drawing of a graph (600). The example graph of FIG. 3 implements in graph form the example triples set forth above regarding Bob and the Mona Lisa. In the example of FIG. 3, the graph edges (604, 608, 612, 616, 620, 624) represent respectively relations among the node, that is, represent the predicates <is a>, <is a friend of>, <is born on>, <is interested in>, <was created by>, and <is about>. The nodes themselves represent the subjects and objects of the triples, <Bob>, <person>, <Alice>, <the $4^{th}$ of July 1990>, <the Mona Lisa>, <Leonardo da Vinci>, and <the video 'La Joconde á Washington'>.

In systems of knowledge representation, knowledge represented in graphs of triples, including, for example, knowledge representations implemented in Prolog databases, Lisp data structures, or in RDF-oriented ontologies in RDFS, OWL, and other ontology languages. Search and inference are effected against such graphs by search engines configured to execute semantic queries in, for example, Prolog or SPARQL. Prolog is a general-purpose logic programming language. SPARQL is a recursive acronym for "SPARQL Protocol and RDF Query Language." Prolog supports queries against connected triples expressed as statements and rules in a Prolog database. SPARQL supports queries against ontologies expressed in RDFS or OWL or other RDF-oriented ontologies. Regarding Prolog, SPARQL, RDF, and so on, these are examples of technologies explanatory of example embodiments of the present invention. Thus, such are not limitations of the present invention.

Knowledge representations useful according to embodiments of the present invention can take many forms as may occur to those of skill in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns HTML documents discussing the literary concept of derivative works as well as calculus procedures. A traditional web search against the keyword "differential" returns HTML pages describing automobile parts and calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is key, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 4:
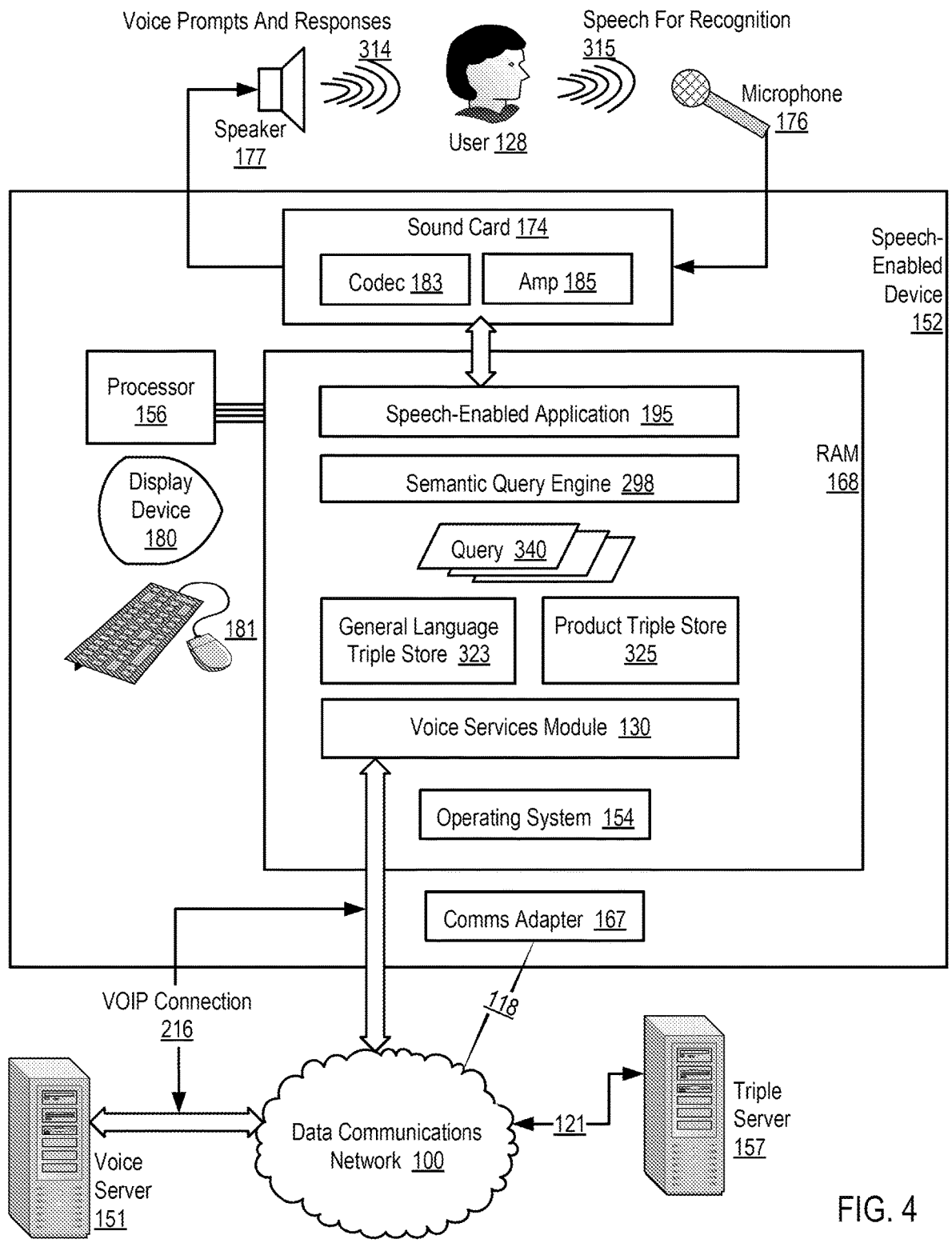
FIG. 4 sets forth a functional block diagram of example apparatus for product presentation in a thin-client architecture according to embodiments of the present invention.

For further explanation, FIG. 4 sets forth a functional block diagram of example apparatus for product presentation in a thin-client architecture according to embodiments of the present invention. A thin-client architecture is a client-server architecture in which at least some of, perhaps most of, perhaps all of, speech processing and triple processing is off-loaded from the client to servers. Thinness of a thin-client varies. The speech-enabled device in the example of FIG. 3 is a thin client in which most speech processing is off-loaded to a voice server (151). The speech-enabled device (152) accepts voice input (315, 176), but then transfers the voice input through a VOIP connection (216) to the voice server (151) where all speech processing is performed. The speech-enabled device in this example does implement some capacity for triple processing (323, 325) and query execution (298), but none of that would be absolutely necessary in a thin client. Devices with reduced storage capacity, a smartwatch or a mobile phone for example, can be implemented with no semantic query engine (298) and no triple store (323, 325), merely passing queries through to a triple server (157) that itself carries out all triple storage and all query processing.

In the particular example of FIG. 4, the speech-enabled device occupies the middle ground of thin-client architecture. It supports little speech processing, but it does support some triple processing. The speech-enabled device in this example performs triple processing and query execution only against triple stores in RAM (168), leaving large-scale storage to the triple server (157). The semantic query engine loads the triple stores as needed to respond to queries. Thus, there are query misses. When the semantic query engine cannot satisfy a query with the triple stores in RAM, it does not conclude failure. Instead, it passes the query to the triple server, and, if the triple server can satisfy the query by use of triples on the server, it passes back to the speech-enabled device both the query results and the triples that satisfied the query, which triples are then stored in RAM on the speech-enabled device for use against similar queries in the future. Over time, such an architecture builds on the speech-enabled device query stores containing frequently useful triples and reduced the need for costly query trips across the network to the triple server—while at the same time functioning with a relatively thin layer of computing resources on the client side. This is a compromise between the extremely thin client with no triple storage at all and the thick client described below with regard to FIG. 8.

The example apparatus of FIG. 4 includes a speech-enabled device (152) and a voice server (151) connected for data communication by a VOIP connection (216) through a data communications network (100). A speech-enabled application (195) runs on the speech-enabled device (152). The speech-enabled application (195) may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example speech-enabled device of FIG. 3 also includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

Speech-enabled application (195) is a user-level, speech-enabled, client-side computer program that presents a voice interface to user (128), provides audio prompts and responses (314) and accepts input speech for recognition (315). Speech-enabled application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to a voice server (151). Speech-enabled application (195) packages digitized speech in recognition request messages according to a VOIP protocol, and transmits the speech to voice server (151) through the VOIP connection (216) on the network (100).

Voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The speech-enabled device (152) in the example of FIG. 4 includes a semantic query engine (298), a module of automated computing machinery that accepts from the speech-enabled application (195) and executes against triple stores (323, 325) semantic queries (340). The speech-enabled application (195) formulates semantic queries with user input from speech (315), GUI, keyboard, mouse (180, 181), or the like. A semantic query is a query designed and implemented against structured data. Semantic queries utilize logical operators, namespaces, pattern matching, sub-classing, transitive relations, semantic rules and contextual full text search. Semantic queries work on named graphs, linked-data, or triples. In embodiments of the present invention, triples typically are linked so as to form graphs. This enables a semantic query to process actual relationships between items of information and infer answers from the network of data. Semantic queries contrast with semantic search, which attempts with various levels of success to use semantics in unstructured text to improve meaning of search results.

Example formulations of semantic queries are had in C, C++, Java, Prolog, Lisp, and so on. The semantic web technology stack of the W3C, for example, offers SPARQL to formulate semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a description logic. In many embodiments of the present invention, semantic queries are asserted against data structured according to a description logic that implements decidability.

In the example apparatus of FIG. 4, the speech-enabled device is coupled for data communication through a communications adapter (167), wireless connection (118), data communications network (100), and wireline connection (121) to a triple server (157). The triple server (157) provides large volume backup for triple stores (323, 325). The triple server is a configuration of automated computing machinery that serializes triples and stores serialized triples in relational databases, tables, files, or the like. The triple server retrieves upon request from non-volatile storage such serialized triples, parses the serialized triples into triple stores, and provides such triple stores upon request to speech-enabled devices for use in systems that utilize the triples in call presentation according to embodiments of the present invention.

Call presentation according to embodiments of the present invention including configuring triples of description logic according to embodiments of the present invention, particularly in a thin-client architecture, may be implemented with one or more voice servers. A voice server is a computer, that is, automated computing machinery, that provides speech recognition and speech synthesis. For further explanation, therefore, FIG. 5 sets forth a block diagram of automated computing machinery comprising an example of a computer useful as a voice server (151) for call presentation according to embodiments of the present invention. The voice server (151) of FIG. 2 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in product presentation according to some embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in other ways as may occur to those of skill in the art, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time may not be the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art.

Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

<grammar scope="dialog" ><![CDATA[
  #JSGF V1.0;
  grammar command;
  <command> = [remind me to] call | phone | telephone <name> <when>;

```
<name> = bob | martha | joe | pete | chris | john | artoush;
<when> = today | this afternoon | tomorrow | next week;
]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars 'I' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.'

The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application (195 on FIG. 3) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm (TIA') (193). The VoiceXML interpreter interprets VoiceXML dialogs provided to the VoiceXML interpreter by a speech-enabled application.

As mentioned above, a Form Interpretation Algorithm (TIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 4 are shown in RAM (168), but many components of such software typically are stored in non-volatile memory also, for example, on a disk drive (170).

Figure 5:
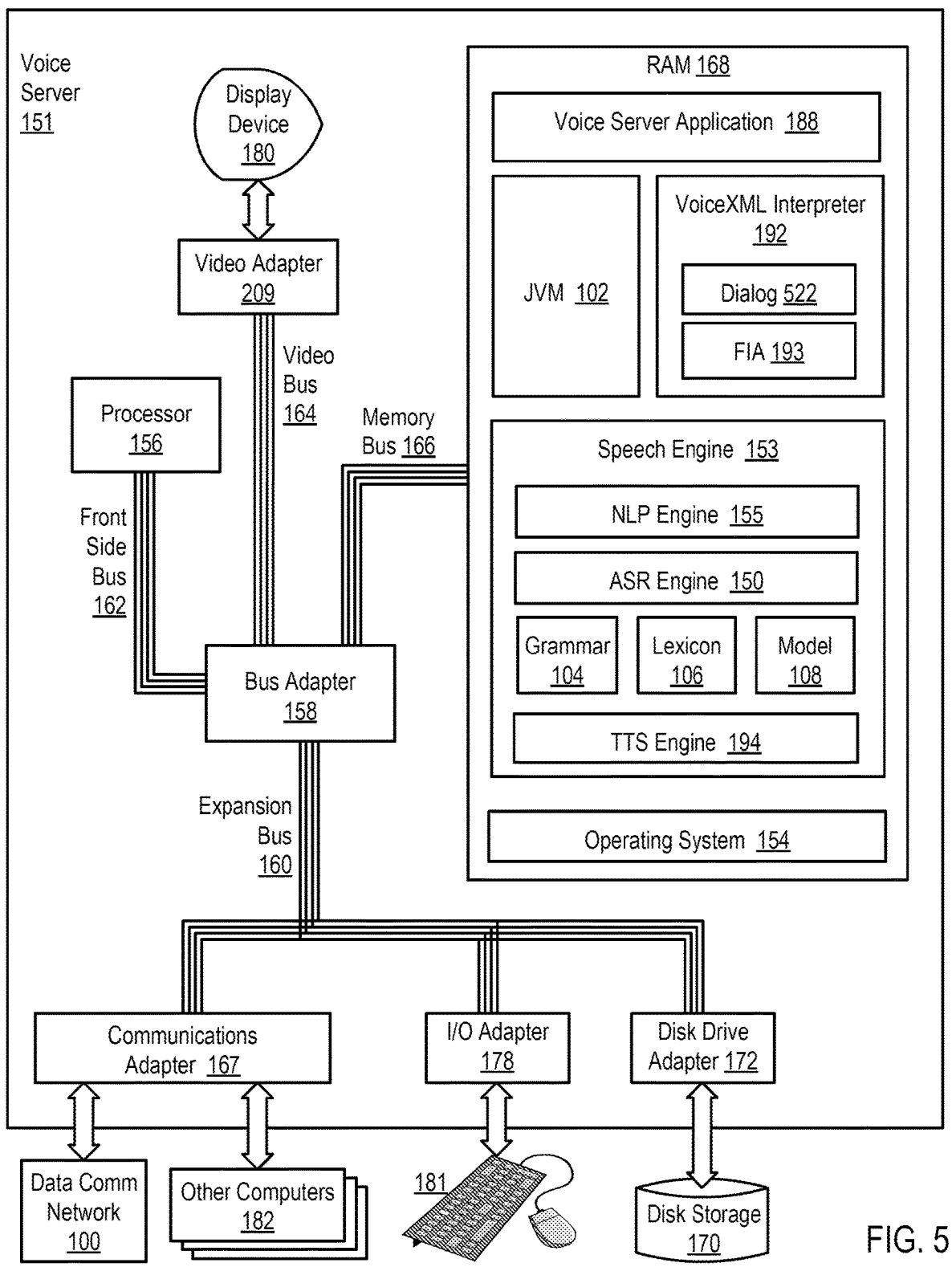
FIG. 5 sets forth a block diagram of automated computing machinery comprising an example of a computer useful as a voice server for product presentation according to embodiments of the present invention.

Voice server (151) of FIG. 5 includes bus adapter (158), a computer hardware component that contains drive electronics for high-speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 5 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics (IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 5 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 4 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 5 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 6:
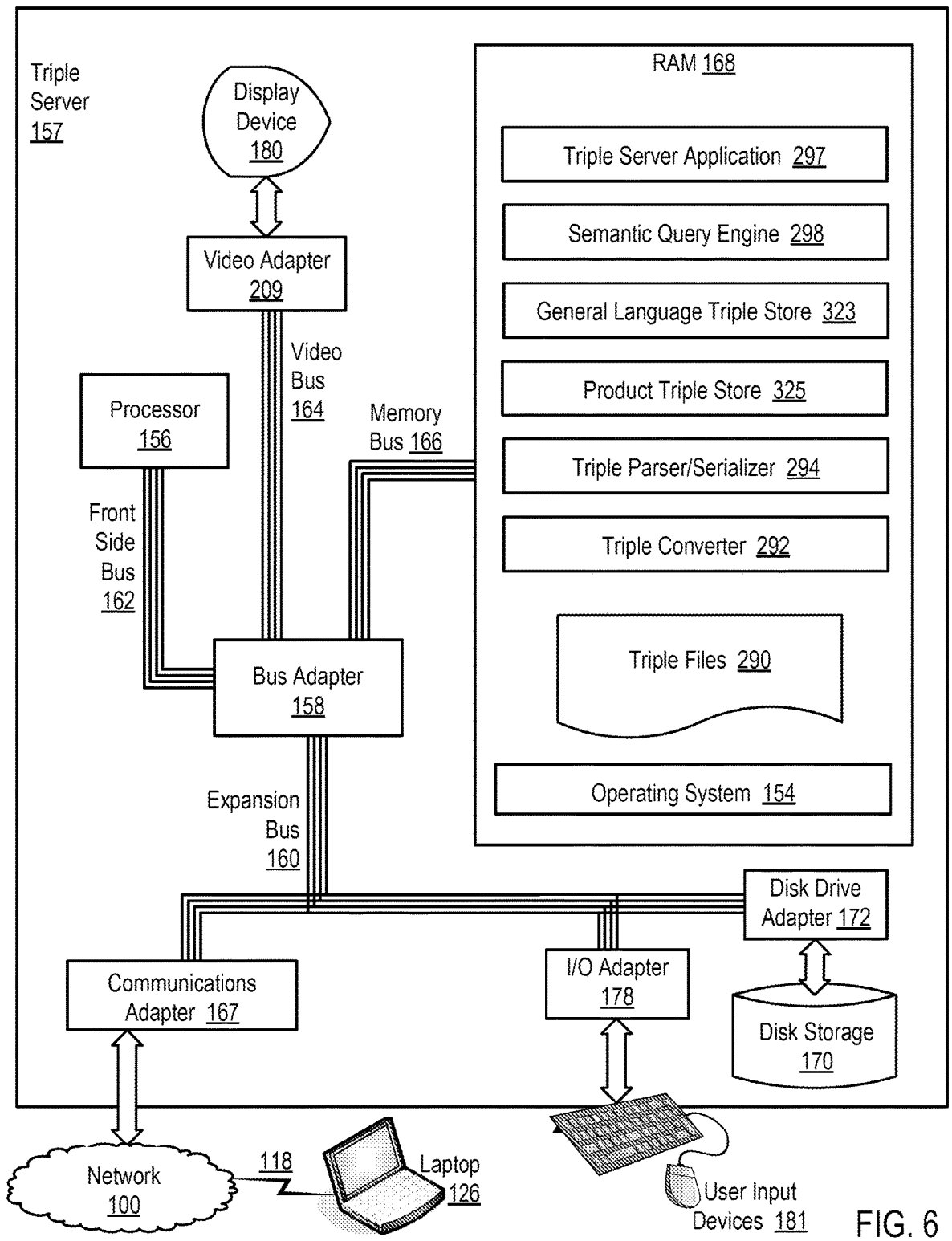
FIG. 6 sets forth a block diagram of automated computing machinery comprising an example of a computer useful as a triple server for product presentation according to embodiments of the present invention.

For further explanation, FIG. 6 sets forth a block diagram of automated computing machinery comprising an example of a computer useful as a triple server (157) for product presentation according to embodiments of the present invention. The triple server (157) of FIG. 6 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a general language triple store (323), a product triple store (325), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (323, 325).

The triple parser/serializer (294) administers the transfer of triples between triple stores and various forms of disk storage. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores into contiguous segments of memory. Contiguous storage can be effected in the C programming language by a call to the malloc( ) function. Contiguous storage can be effected by the Python buffer protocol. Contiguous storage can be effected in other ways as will occur to those of skill in the art, and all such ways are within the scope of the present invention. In many embodiments, both triple stores (323, 325) would be stored in one or two segments of contiguous memory.

Figure 7:
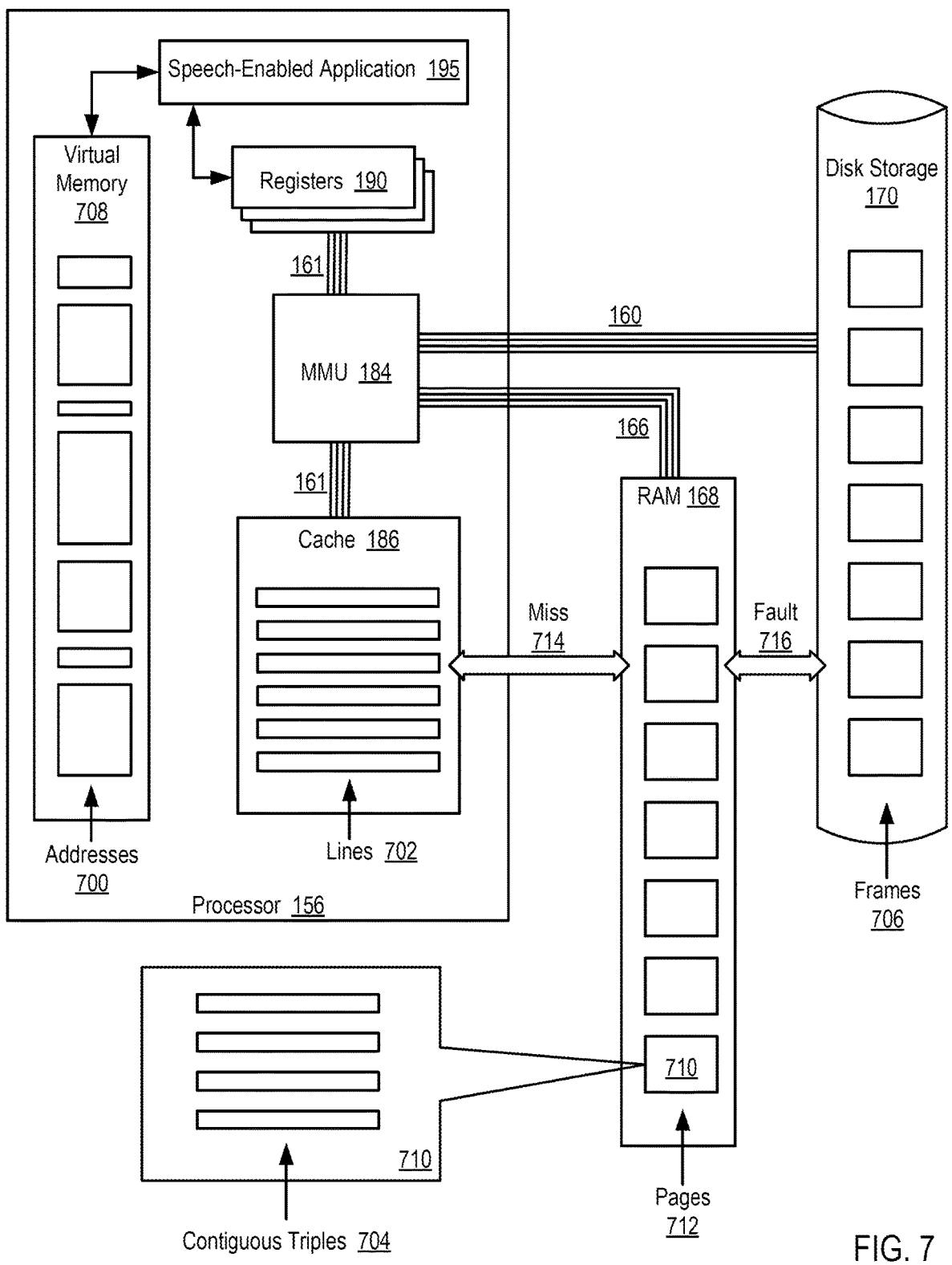
FIG. 7 sets forth a block diagram of a computer memory system that includes a computer processor composed of various registers executing a speech-enabled application program.

Contiguous memory is explained in more detail with reference to FIG. 7. FIG. 7 sets forth a block diagram of a computer memory system that includes a computer processor composed of various registers (190) executing a speech-enabled application program (195). The application and the registers of the processor operate with memory addresses (700) disposed in virtual memory (708). The contents of virtual memory are backed up with physical storage in an on-processor cache (186), RAM (168), and disk (170). The contents of the cache are organized in cache lines (702). Memory in RAM is organized in pages (712). Memory on disk is organized in frames (706). A memory management unit ("MMU") (184) translates virtual memory addresses into physical memory locations and moves contents of memory from physical storage to and from processor registers. In accessing physical memory, the MMU always looks first in the cache. A failure to find content in the cache is termed a cache miss (714). Upon a cache miss, the MMU find sought content in RAM (168) and moves it into the cache. Failing to find sought content in RAM, a failure termed a page fault (716), the MMU looks all the way out to the page frames on disk, moves content into RAM and then into cache.

Here is the challenge addressed by the use of contiguous memory. Cache access takes 10 nanoseconds. RAM access takes 100 nanoseconds. Disk access takes 10,000,000 nanoseconds. Those numbers are not intuitive. People don't experience time in nanoseconds. Look at it in more familiar terms. If cache access is viewed as taking one minute, then RAM access takes 10 minutes, and disk access for the same data takes two years. Triples scattered across virtual memory addresses risk being stored in multiple page frames. Triples stored near one another in a contiguous memory segment are much more likely to be stored in a small number of page frames.

Suppose a product is composed of 500-word families each of which includes three words so that the entire product is expressed in 1500 words each of which on average is composed of 10 bytes of storage for a total for the product of 15 kilobytes of storage. Some computer systems today support memory page sizes of a megabyte or more. Such a product can be stored in a single memory page, and, once that page is in RAM, operation of the product can proceed with no risk of page faults at all. Even if contiguous storage for such a product fell across a page boundary, the entire product information can be loaded with only two-page faults, and, after it is loaded into RAM, it can be operated with zero page faults going forward. Cache misses would still be required to load the contents into cache, but, except for the first one or two misses, none of the others would risk a page fault. The inventors estimate that after a short period of operation, the cache miss rate would be less than one percent. That is, when a product is disposed in contiguous memory according to embodiments of the present invention, memory access times generally will approximate cache access times, just a few nanoseconds, for more than 99% of memory access.

Figure 8:
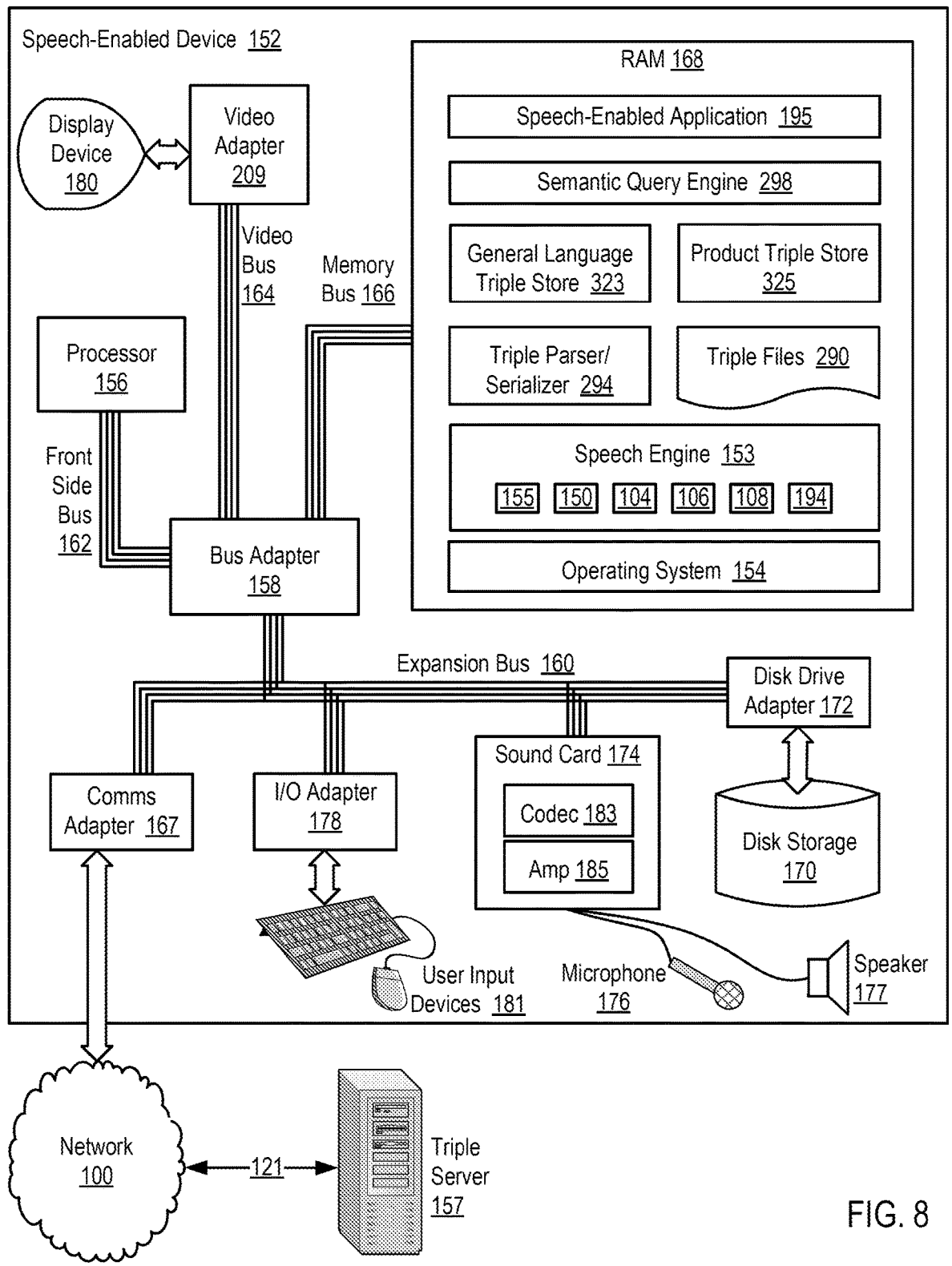
FIG. 8 sets forth a functional block diagram of example apparatus for product presentation in a thick-client architecture according to embodiments of the present invention.

For further explanation, FIG. 8 sets forth a functional block diagram of example apparatus for product presentation in computer memory in a thick-client architecture according to embodiments of the present invention. A thick-client architecture is a client-server architecture in which all or most of the functionality required to administer call presentation with triples of a description logic is supported directly on client-side speech-enabled devices rather than on servers. Servers are used for backup and synchronization rather than speech recognition or semantic queries. A thick client requires resources, processor power and storage, possibly not always available on a small device such as a smartwatch. In a thick client with sufficient data processing resources, however, all pertinent functionality, queries, triples, speech, are typically immediately and fully useful, regardless of network availability.

The thick-client speech-enabled device in the example of FIG. 8 is automated computer machinery that includes a processor (156), RAM (168), data buses (162, 164, 166, 160), video (180, 209), data communications (167), I/O (178), and disk storage (170). Disposed in RAM are a speech-enabled application program (195), a semantic query engine (298), a general language triple store (323), a product triple store (325), a triple parser/serializer (294), a triple converter (292), and one or more triple files (290). The speech-enabled application (195) accepts from user input semantic queries that it passes to the semantic query engine (298) for execution against the triple stores (323, 325). All pertinent triples are available in local RAM. All queries succeed or fail based on local storage alone. No queries are ever forwarded to the triple server (157). The triple server (157) provides long-term backup and synchronization functions when multiple client-side devices share the contents of triple stores, but, for any particular query, all responsive triples are available directly on the client side.

The triple parser/serializer (294) administers the transfer of triples between triple stores and disk storage (170), and disk storage is available directly on the thick client (152) rather than across a network on a server. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores into contiguous segments of memory.

The speech-engine engine (153) is a full-service NLP-SR engine that includes natural language processing (155), speech recognition (150), a grammar (104), a lexicon (106), a model (108), and text-to-speech processing (194), all as described in more detail above with regard to FIG. 4. The thick-client speech-enabled device (152) has no need to reach across a network for speech-related processing. Full speech enablement is available directly on the speech-enabled device itself.

Figure 9:
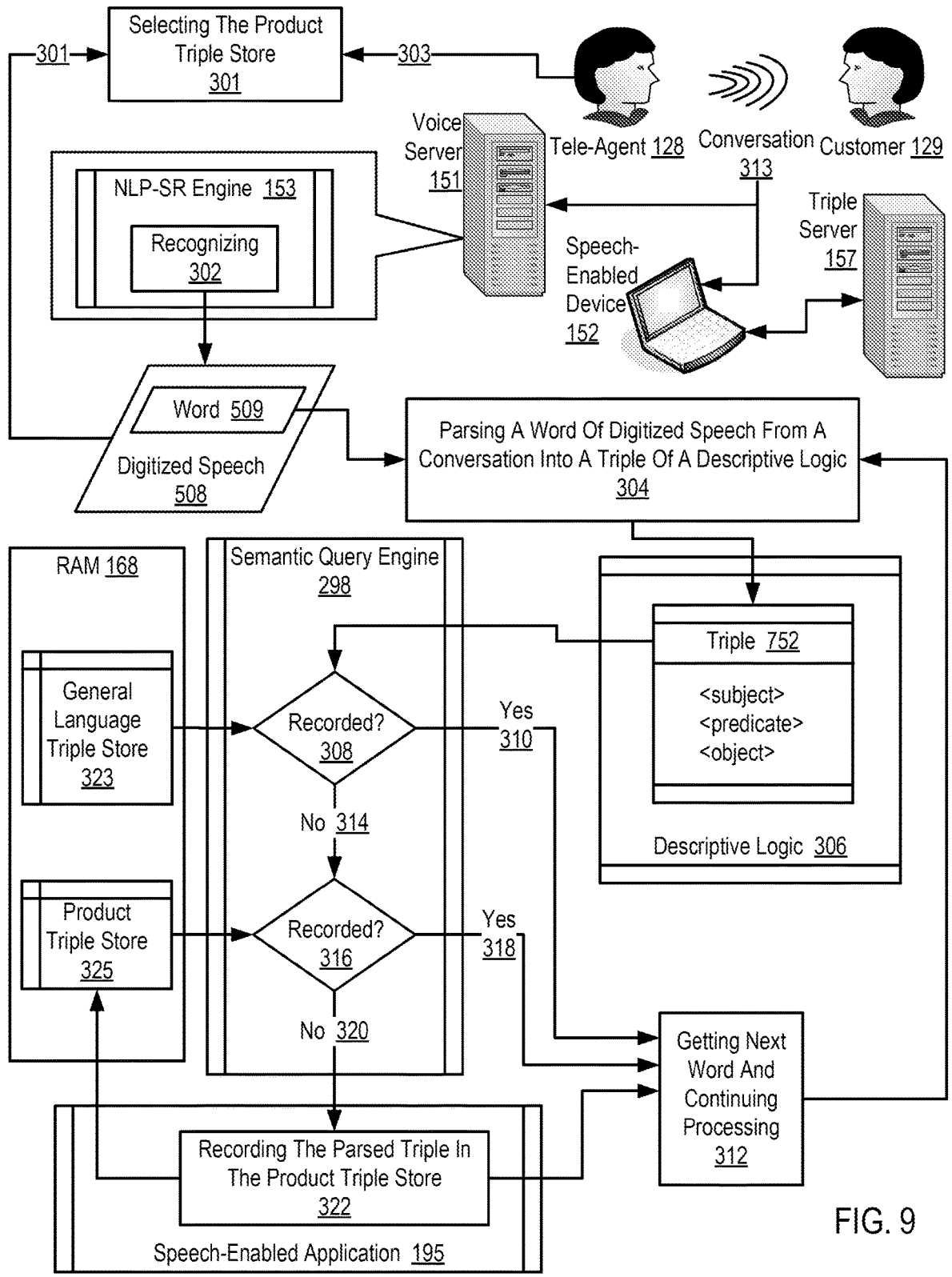
FIG. 9 sets forth a flow chart illustrating an example method of product presentation according to embodiments of the present invention.

For further explanation, FIG. 9 sets forth a flow chart illustrating an example method of product presentation according to embodiments of the present invention. The functions of the method of FIG. 9 are implemented with or disposed upon some combination of a speech-enabled device, a voice server (151), and a triple server (157). That is, for example, the NLP-SR engine (153) can be disposed upon the voice server (151) in a thin-client architecture or upon the speech-enabled device (152) in a thick-client architecture. So, the question exactly where any particular function occurs depends upon the architecture, although all such elements are computers—and they all include computer memory that can configured according to various embodiments of the present invention The method of FIG. 9 includes recognizing (302), by a natural language processing speech recognition ("NLP-SR") engine (153) into digitized speech (508), speech from a conversation (313). The method also includes parsing (304) a word (509) of digitized speech (508) from the conversation (313) into a triple (752) of a description logic (306). In many embodiments of methods like the one illustrated here; the description logic (306) is a member of a family of formal knowledge representation languages in which a query of the logic is decidable.

In typical embodiments, both recognizing (302) speech and parsing (304) words into triples are carried out by an NLP-SR engine (153). The NLP-SR engine inputs, optionally at least, the entire conversation (313) and presents to the parsing function (304) a stream of digitized speech (508). The parsing function processes a word (509), hands a triple off to a query engine (298) for further processing, and then loops (312) back to parse the next word in the stream of digitized speech.

The NLP-SR engine hands off a parsed triple (752) to a semantic query engine (298). The semantic query engine determines whether the parsed triple is recorded (308) in a general language triple store (323) in computer memory (168), and, if it is not (314), the query engine then determines whether the parsed triple is recorded (316) in a product triple store (325) in the computer memory.

If the parsed triple is recorded in neither the general language triple store nor the product triple store (314, 320), then a speech-enabled application (195) records (322) the parsed triple in the product triple store (325). After recording (322), the method loops (312) back to parse (304) the next word (509) in the stream of digitized speech (508). If the parsed triple is already stored in either a general language triple store (310) or a product triple store (318), then the method loops (312) directly back to parsing (304) a next word (509) without recording (322).

The general language triple store (323) is composed of structured definitions of words not special to any particular knowledge domain, in which each structured definition of the general language store is composed of a triple of the description logic. The product triple store (325) is composed of structured definitions of words that are special to a particular knowledge domain, where each structured definition of the product on triple store is composed of a triple of the description logic. Both triple stores (323, 325) in embodiments can be stored in contiguous memory, either in a same segment of contiguous memory or in separate segments of contiguous memory.

And triple stores can include more than one product. User (128), for example, can be a tele-agent in a call center who is expected to field calls from customer in health care, law offices, and residential construction. The user needs help on the phone in three specialized terminologies, not just one. At least some embodiments, therefore, include selecting (301) among a plurality of product triple stores the product triple store (325) for use in any particular conversation. The user can simply press or click a button in a dashboard on a GUI to select among products. The correct product can be inferred from the industry specifications or other information with which the user is dealing in the dashboard, the company with whom the tele-agent is speaking. The correct product can be inferred from usage, asserting queries with parsed triples against multiple product triple stores and select the product triple store with the most hits. Inferring from usage may mean that the user need do nothing—the user might not even have the dashboard up on screen, or the user might even have up a dashboard at the beginning of a new conversation that is unrelated to the subject area of the new conversation.

In some embodiments, the general language triple store (323) and the product triple store (325) are logically-connected segments of a language-specific triple store. For further explanation, FIG. 10 sets forth a graph of a language-specific triple store in which a general language triple store (323) and two product triple stores are logically-connected segments of a same overall graph (201). All words (202-224) in graph (201) are subjects of triples that identify them as words of English (200). Words (202-208) are identified in triples as words of the English language generally (225). Words (210-216) are identified in triples as words of a medical product (226). Words (218-224) are identified in triples as words of a legal product (228). In embodiments, all words in the graph typically are subjects of triples with definitions. In this example, for convenience of illustration, only words (208, 210, 218) are shown with definitions (236, 244, 252).

In other embodiments, the general language triple store and the product triple store are implemented in separate stores and separate graphs. For further explanation, FIG. 11 sets forth separate graphs of a general language triple store (238), a medical product in English (240), and a legal product in English (228). All words (202-224) in graphs (238, 240, 242) are subjects of triples that identify them as words of English (200, 226, 228). Words (202-208) in graph (238) are identified in triples as words of the English language generally (200). Words (210-216) in graph (240) are identified in triples as words of an English medical product (226). Words (218-224) in graph (242) are identified in triples as words of an English legal product (228). In this example, all words in all three graphs are subjects of triples with definitions (230-258).

Queries against a product triple store in a graph like graph (201) require a clause specifying the particular product against which the query is issued:

```
Query:
    SELECT     ?definition
    WHERE      { :word(210) :is a word of :medical product.
                 :word(210) :has definition ?definition . }
Response: :definition(244)
```

Figure 10:
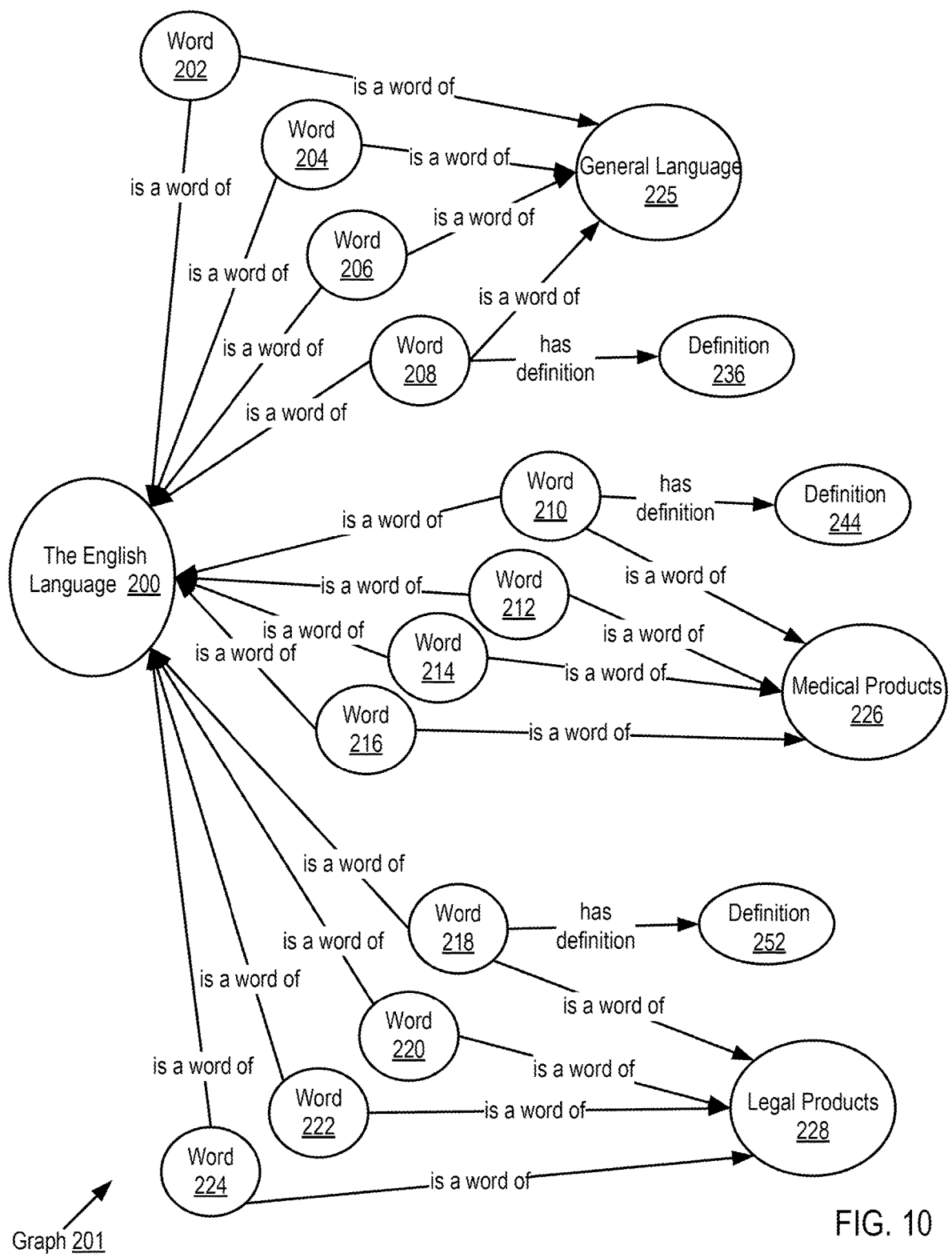
FIG. 10 sets forth a graph of a language-specific triple store in which a general language triple store and two product triple stores are logically-connected segments of a same overall graph.

Queries against a product triple stores in separate graphs like those shown in FIG. 10 do not require a clause specifying the particular product against which the query is issued:

```
Query on graph (240):
    SELECT     ?definition
    WHERE      { :word(210) :has definition ?definition . }
Response: :definition(244)
```

For further explanation, FIG. 12 sets forth a flow chart illustrating a further example method of product presentation according to embodiments of the present invention. The method of FIG. 12 is similar to the example method of FIG. 9, including as it does recognizing digitized speech (508), parsing (304) a word (509) of digitized speech (508) into a triple (752) of a description logic (306), determining whether the parsed triple is recorded (308) in a general language triple store (323), and, if it is not (314), then determining whether the parsed triple is recorded (316) in a product triple store (325) in the computer memory, recording (322) a parsed triple in the product triple store (325), and looping (312) back to parsing (304) the next word (509) in a stream of digitized speech (508).

The method of FIG. 12 differs from that of FIG. 9 by including two types of queries, one type (339, 340) that asks whether a triple is in a store, and another type that queries for definitions. In the method of FIG. 12, determining (308) whether a parsed triple (752) is recorded in a general language triple store (323) is carried out by asserting (324) against the general language triple store a query (339) based upon the parsed triple. Similarly, determining (316) whether a parsed triple (752) is recorded in a product triple store (325) is carried out by asserting (326) against the product triple store a query (340) based upon the parsed triple.

These queries (339, 340) ask only whether the parsed triple is presently recorded in a triple store. They do not ask for definitions or inferences. These queries (339, 340) are semantic queries that take a form similar to the data they query. Take for example the connected triples describing Bob and the Mona Lisa, again expressed here in an abstract syntax with (subject predicate object) separated by spaces:

(Bob isA person)
(Bob isAFriendOf Alice)
(Bob isBornOn "the 4$^{th}$ of July 1990")
(Bob isInterestedIn "the Mona Lisa")
("the Mona Lisa" wasCreatedBy "Leonardo da Vinci")
("the video 'La Joconde á Washington'" isAbout "the Mona Lisa")

In an example where the parsed triple asserts (Bob isAFriendOf Mike), then this query:

ASK {:Bob :isAFriendOF :Mike.} returns "No." The ASK syntax is fashioned after SPARQL, and it reports only success or failure in matching the query, nothing else. In an example where the parsed triple asserts (Bob isAFriendOf Alice), then this query:

ASK {:Bob :isAFriendOF :Alice.} returns "Yes." Thus, the queries (339, 340) ask only whether the parsed triple is presently recorded in one of the triple stores (323, 325).

The method of FIG. 12 also includes executing (338) by a query engine (298) against the product triple store (325) a semantic query (341) for a definition of a term of product recorded in the product triple store. The semantic query is, for example, received (344) in the query engine through an element of a graphical user interface (110)—or, for a further example, through a speech-enabled user interface such as a microphone (176) and VoiceXML dialog (522). The query engine (298) retrieves (343) and displays (348, 350) the results (342) of the semantic query (341) either back through the element of the graphical user interface (110) or through the speech-enabled user interface (522, 177).

Query (341) is different from the queries (339, 340) discussed just above. Query (341) does not ask merely whether data is in a store, query (341) asks for the data itself to be returned. Thus, again with reference to Bob and the Mona Lisa, this query, which requests predicates and objects from all triples in which Bob is the subject:

```
SELECT          ?predicate ?object
WHERE           { :Bob :?predicate :?subject .}
returns this:
    :isA              :person
    :isAFriendOf      :Alice
    :isBornOn         :"the 4$^{th}$ of July 1990"
    :isInterestedIn   :"the Mona Lisa")
This query:
```

-continued

```
SELECT      ?predicate ?object
WHERE       { :"the Mona Lisa" :?predicate :?subject .}
returns this:
    :wasCreatedBy    :"Leonardo da Vinci"
And this query:
SELECT      ?subject ?predicate ?object
WHERE       {:?subject :?predicate :?"the Mona Lisa".}
returns this:
    :"the video 'La Joconde á Washington'" :isAbout :"the Mona Lisa"
```

For further explanation, FIG. 13 sets forth a flow chart illustrating a further example method of product presentation to embodiments of the present invention. The method of FIG. 13 is similar to the example method of FIG. 8, including as it does recognizing digitized speech (508), parsing (304) a word (509) of digitized speech into a triple (752) of a description logic, determining whether the parsed triple is recorded (308) in a general language triple store (323), and, if it is not (314), then determining whether the parsed triple is recorded (316) in a product triple store (325) in the computer memory, recording (322) a parsed triple in the product triple store (325), and looping (312) back to parsing (304) the next word (509) in a stream of digitized speech (508).

The method of FIG. 13 differs from that of FIG. 9 by including an additional confirmation (328) that a parsed triple (752) actually is to be recorded in a product triple store (325). In the example of FIG. 12, a parsed triple (752) has been determined not recorded (314) in a general language triple store and not recorded (320) in the pertinent product triple store. Before recording (322) the parsed triple in the product triple store, the method of FIG. 12 confirms (328) that the parsed triple should be recorded in the product triple store. If the parsed triple fails confirmation (330), the method proceeds by looping (312) back to parsing (304) the next word in the stream of digitized speech (304).

Consider a use case in which a user who is a tele-agent in a call center is discussing with a customer a prospective sale of residential construction materials. The NLP-SR engine typically provides as digitized speech words organized in sentences and identified as parts of speech. The parsing process then can, for example, take the subject, the verb, and a direct object from a sentence and parse them into a triple with a subject, predicate, and object. From this sentence, for example, "Doors are construction materials," the parser can produce (door isA constructionMateral), and pass that triple along to the rest of the process as a candidate parsed triple (752) for inclusion in the product store (325). But these assertions regarding doors are more difficult:

A door is a gateway in time.
Doors are member of a rock band.
A door is a figure of speech in The Doors Of Perception by Aldous Huxley.

It is hard to tell why such results originate in a conversation about residential construction. Perhaps the speech engine made a mistake. Perhaps the users wandered off topic. All of which makes little difference. The point is that the parser will produce triples from these words that are not pertinent to residential construction. Such triples are likely not in the product on triple store, but also such triples may not be in the general language triple store. In which case, such triples become candidates for inclusion in the product triple store despite the fact that such triples do not really belong in the product triple store.

The confirmation process (328) can query a technical dictionary (336) of construction terms. The technical dictionary is unstructured text, no semantics, no triples, but it does contain searchable definitions. If "gateway in time," "rock band," or "The Doors Of Perception" do not appear in definitions of doors, the confirmation process can conclude (330) that certain triples do not belong (330) in the product triple store (325) and loop (312) to continue processing. The confirmation process (328) can query a user (334), through, for example, a GUI interface or a speech interface, present a candidate parsed triple, and ask whether to add it to the product triple store. If the user confirms (332), then record (322) and loop (312). If the user does not confirm (330), loop (312) without recording (322).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A speech enabled product presentation engine comprising: a product recognition module, comprising machine-readable instructions stored more non-transitory computer-readable mediums, the product recognition module configured to:
   identify, in dependence upon digitized speech for recognition, a product articulated in the conversation between a tele-agent and a customer;
   parse one or more words of digitized speech from the conversation into a triple of a description logic, wherein the triple of the description logic includes a subject, a predicate, and an object, wherein the one or more words describe a product;
   determine whether the parsed triple is recorded in a general language triple store within a computer memory accessible by the product recognition module;
   determine whether the parsed triple is recorded in a product triple store within the computer memory; and
   in response to determining that the parsed triple is recorded in neither the general language triple store nor the product triple store, record the parsed triple in the product triple store, wherein the product triple store stores a plurality of triples of description logic, and wherein each triple of description logic describes information of a corresponding product that includes goods or a service;
   a product dimension module, comprising machine-readable instructions stored on one or more non-transitory computer-readable mediums and configured to: query an internal customer relationship management (CRM) system, in dependence upon the identified product, and receive one or more descriptions of one or more dimensions of the product for presentation to the tele-agent during a call with the customer.

2. The product presentation engine of claim 1 wherein identifying the articulated product includes:
   parsing one or more words of digitized speech from the conversation between the tele-agent; and
   comparing the parsed one or more words with a product triple store within a knowledge graph of a semantic graph database.

3. The product presentation engine of claim 1 wherein the product recognition module is further configured to:
   recognize, by a natural language processing speech recognition ("NLP-SR") engine, the digitized speech from the conversation.

4. The product presentation engine of claim 1 wherein the description logic is a member of a family of formal knowledge representation languages in which a query of the logic is decidable.

5. The product presentation engine of claim 1 wherein:
the general language triple store comprises structured definitions of words not special to any particular knowledge domain, each structured definition of the general language store comprising a triple of the description logic; and
the product triple store comprises structured definitions of words that are special to the particular knowledge domain associated with products, each structured definition of the product triple store comprising a triple of the description logic.

6. The product presentation engine of claim 1 wherein the general language triple store and the product triple store are logically-connected segments of a language-specific triple store.

7. The product presentation engine of claim 1 wherein the product recognition module is further configured to select the product triple store from among a plurality of product triple stores.

8. The product presentation engine of claim 1 wherein the product recognition module configured to:
determine whether the parsed triple is recorded in a general language triple store and assert against the general language triple store a query comprising the parsed triple; and
determine whether the parsed triple is recorded in a product triple store and assert against the product triple store a query comprising the parsed triple.

9. A method comprising:
parsing a word of digitized speech from a conversation into a triple of a description logic, wherein the triple of the description logic includes a subject, a predicate, and an object, wherein the word describes a product;
determining whether the parsed triple is recorded in a general language triple store of a computer memory;
determining whether the parsed triple is recorded in a product triple store of the computer memory; and
in response to determining that the parsed triple is recorded in neither the general language triple store nor the product triple store, recording the parsed triple in the product triple store, wherein the product triple store stores a plurality of triples of description logic, wherein each triple of description logic describes information of a corresponding product that includes goods or a service.

10. The method of claim 9 further comprising recognizing, by a natural language processing speech recognition ("NLP-SR") engine, the digitized speech from the conversation.

11. The method of claim 9 wherein the description logic is a member of a family of formal knowledge representation languages in which a query of the logic is decidable.

12. The method of claim 9 wherein:
the general language triple store comprises structured definitions of words not special to any particular knowledge domain, each structured definition of the general language store comprising a triple of the description logic; and
the product triple store comprises structured definitions of words that are special to a particular knowledge domain of products, each structured definition of the product triple store comprising a triple of the description logic.

13. The method of claim 9 wherein the general language triple store and the product triple store are logically-connected segments of a language-specific triple store.

14. The method of claim 9 further comprising selecting the product triple store from among a plurality of product triple stores.

15. The method of claim 9 wherein:
determining whether the parsed triple is recorded in a general language triple store comprises asserting against the general language triple store a query comprising the parsed triple; and
determining whether the parsed triple is recorded in a product triple store comprises asserting against the product triple store a query comprising the parsed triple.

16. The method of claim 9 further comprising:
executing by a query engine of the computer system against the product triple store a semantic query for a definition of a term of product recorded in the product triple store, the semantic query received in the query engine through an element of a graphical user interface; and
displaying results of the semantic query through the element of the graphical user interface.

17. The method of claim 9 further comprising:
executing by a query engine of the computer system against the product triple store a semantic query for a definition of a term related to the product recorded in the product triple store, the semantic query received in the query engine through a speech-enabled user interface; and
displaying results of the semantic query through the speech-enabled user interface.

* * * * *